United States Patent
Setayesh et al.

(10) Patent No.: US 11,403,464 B2
(45) Date of Patent: *Aug. 2, 2022

(54) METHOD AND SYSTEM FOR IMPLEMENTING SEMANTIC TECHNOLOGY

(71) Applicant: Oracle International Corporation, Redwood Shores, CA (US)

(72) Inventors: Mehrshad Setayesh, Lafayette, CO (US); Marta Lynn Studinger, Centennial, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,378

(22) Filed: Jul. 12, 2019

(65) Prior Publication Data
US 2019/0332675 A1 Oct. 31, 2019

Related U.S. Application Data

(63) Continuation of application No. 14/815,692, filed on Jul. 31, 2015, now Pat. No. 10,409,912.
(Continued)

(51) Int. Cl.
*G06F 40/279* (2020.01)
*G06F 40/30* (2020.01)
(Continued)

(52) U.S. Cl.
CPC .............. *G06F 40/30* (2020.01); *G06F 9/542* (2013.01); *G06F 16/2379* (2019.01);
(Continued)

(58) Field of Classification Search
CPC .. G06F 17/2785; G06F 16/35; G06F 17/2705; G06F 16/285; G06F 16/972; G06F 21/554; H04L 51/32
See application file for complete search history.

(56) References Cited

U.S. PATENT DOCUMENTS 5,873,056 A 2/1999 Liddy et al.
5,946,386 A 8/1999 Rogers et al.
(Continued)

OTHER PUBLICATIONS

Adult Survivors of Childhood Trauma and Recovered Memories, http://www.istss.org/public-resources/remembering-childhood-trauma.aspx, Mar. 5, 2018.
(Continued)

*Primary Examiner* — Olujimi A Adesanya
(74) *Attorney, Agent, or Firm* — Invoke

(57) ABSTRACT

Disclosed is an approach for allowing an entity to perform semantic analysis upon private data possessed by an enterprise, and to automatically perform categorization of that data for processing within the enterprise. A semantic API can be provided to allow the enterprise to provide the private data to a sematic analysis system, even when the semantic analysis system is configured as a multi-tenant system that handles other items of public or private data. A rules-based routing architecture may be provided to facilitate analysis and routing of analyzed messages to the appropriate destination within the organization.

18 Claims, 22 Drawing Sheets

Related U.S. Application Data

(60) Provisional application No. 62/031,771, filed on Jul. 31, 2014.

(51) Int. Cl.

| | | |
|---|---|---|
| *G06F 16/35* | (2019.01) | |
| *H04L 51/00* | (2022.01) | |
| *G06F 40/169* | (2020.01) | |
| *G06F 16/23* | (2019.01) | |
| *G06F 16/28* | (2019.01) | |
| *G06F 16/335* | (2019.01) | |
| *G06F 9/54* | (2006.01) | |
| *H04L 43/16* | (2022.01) | |
| *H04L 51/046* | (2022.01) | |
| *H04L 51/52* | (2022.01) | |

(52) U.S. Cl.
CPC .......... *G06F 16/285* (2019.01); *G06F 16/335* (2019.01); *G06F 16/353* (2019.01); *G06F 40/169* (2020.01); *H04L 43/16* (2013.01); *H04L 51/046* (2013.01); *H04L 51/14* (2013.01); *H04L 51/32* (2013.01)

(56) References Cited

U.S. PATENT DOCUMENTS

| | | | |
|---|---|---|---|
| 6,349,307 | B1 | 2/2002 | Chen |
| 7,289,949 | B2 | 10/2007 | Warner et al. |
| 7,383,172 | B1 | 6/2008 | Jamieson |
| 8,090,724 | B1 | 1/2012 | Welch et al. |
| 8,245,135 | B2 | 8/2012 | Cai et al. |
| 8,762,302 | B1 | 6/2014 | Spivack et al. |
| 8,812,752 | B1 | 8/2014 | Shih et al. |
| 8,954,440 | B1 | 2/2015 | Gattani et al. |
| 8,990,200 | B1 | 3/2015 | Christensen et al. |
| 9,026,529 | B1 | 5/2015 | Osofsky et al. |
| 9,336,192 | B1 | 5/2016 | Barba et al. |
| 9,727,925 | B2* | 8/2017 | Subramanian ........ H04L 67/306 |
| 10,002,330 | B2 | 6/2018 | Kulkarni et al. |
| 2002/0107843 | A1 | 8/2002 | Biebesheimer et al. |
| 2002/0116174 | A1 | 8/2002 | Lee et al. |
| 2003/0061200 | A1 | 3/2003 | Hubert et al. |
| 2003/0154072 | A1 | 8/2003 | Young et al. |
| 2004/0162827 | A1 | 8/2004 | Nakano |
| 2004/0205448 | A1 | 10/2004 | Grefenstette et al. |
| 2004/0225667 | A1 | 11/2004 | Hu et al. |
| 2005/0091203 | A1 | 4/2005 | Liu et al. |
| 2005/0108001 | A1 | 5/2005 | Aarskog |
| 2006/0069589 | A1 | 3/2006 | Nigam et al. |
| 2006/0153345 | A1 | 7/2006 | Bushey et al. |
| 2007/0067157 | A1 | 3/2007 | Kaku et al. |
| 2008/0133488 | A1 | 6/2008 | Bandaru et al. |
| 2009/0112892 | A1 | 4/2009 | Cardie et al. |
| 2009/0177484 | A1 | 7/2009 | Davis et al. |
| 2009/0271324 | A1 | 10/2009 | Jandhyala et al. |
| 2009/0285384 | A1 | 11/2009 | Pollock et al. |
| 2010/0119053 | A1* | 5/2010 | Goeldi ............... G06Q 30/0251 379/265.09 |
| 2010/0125540 | A1 | 5/2010 | Stefik et al. |
| 2010/0280985 | A1 | 11/2010 | Duchon et al. |
| 2010/0312769 | A1* | 12/2010 | Bailey ................. G06F 16/285 707/740 |
| 2011/0153595 | A1 | 6/2011 | Bernstein et al. |
| 2011/0196670 | A1 | 8/2011 | Dang et al. |
| 2011/0202334 | A1 | 8/2011 | Abir |
| 2011/0282651 | A1 | 11/2011 | Nygaard et al. |
| 2012/0011432 | A1 | 1/2012 | Strutton |
| 2012/0089621 | A1 | 4/2012 | Liu et al. |
| 2012/0124149 | A1* | 5/2012 | Gross ..................... H04L 67/10 709/206 |
| 2012/0131139 | A1 | 5/2012 | Siripurapu et al. |
| 2012/0278388 | A1* | 11/2012 | Kleinbart ............. G06Q 10/10 709/204 |
| 2012/0303559 | A1 | 11/2012 | Dolan |
| 2013/0081056 | A1 | 3/2013 | Hu et al. |
| 2013/0136253 | A1* | 5/2013 | Liberman Ben-Ami ................... H04M 3/5191 379/265.09 |
| 2013/0238785 | A1 | 9/2013 | Hawk et al. |
| 2013/0262442 | A1 | 10/2013 | Dennis |
| 2013/0268534 | A1 | 10/2013 | Mathew et al. |
| 2013/0336310 | A1 | 12/2013 | Laasik et al. |
| 2013/0339457 | A1* | 12/2013 | Freire ..................... H04L 51/22 709/206 |
| 2014/0039877 | A1* | 2/2014 | Guenigault ............. G06F 40/10 704/9 |
| 2014/0074551 | A1 | 3/2014 | Setayesh et al. |
| 2014/0074843 | A1 | 3/2014 | White et al. |
| 2014/0156341 | A1* | 6/2014 | Kruk ..................... G06Q 50/01 705/7.29 |
| 2014/0164530 | A1 | 6/2014 | Stoertenbecker |
| 2014/0180788 | A1* | 6/2014 | George .............. G06Q 30/0277 705/14.41 |
| 2014/0188457 | A1* | 7/2014 | Fink ........................ G06F 40/30 704/9 |
| 2014/0189114 | A1 | 7/2014 | Richardson |
| 2014/0215443 | A1 | 7/2014 | Voccio et al. |
| 2014/0344327 | A1* | 11/2014 | Lovric ................. H04L 67/2804 709/203 |
| 2014/0344718 | A1 | 11/2014 | Rapaport et al. |
| 2014/0372513 | A1* | 12/2014 | Jones ..................... G06F 9/5072 709/203 |
| 2015/0089409 | A1 | 3/2015 | Asseily et al. |
| 2015/0100377 | A1 | 4/2015 | Penumaka et al. |
| 2015/0120302 | A1 | 4/2015 | McCandless et al. |
| 2015/0149448 | A1 | 5/2015 | McCandless et al. |
| 2015/0149463 | A1 | 5/2015 | McCandless et al. |
| 2015/0170152 | A1 | 6/2015 | Shaffer et al. |
| 2015/0195406 | A1 | 7/2015 | Dwyer et al. |
| 2015/0220647 | A1 | 8/2015 | Gangwani |
| 2016/0034445 | A1 | 2/2016 | Setayesh et al. |
| 2016/0034560 | A1 | 2/2016 | Setayesh et al. |
| 2016/0034571 | A1 | 2/2016 | Setayesh et al. |
| 2016/0092551 | A1 | 3/2016 | Tang et al. |

OTHER PUBLICATIONS

Final Office Action dated May 20, 2016 for related U.S. Appl. No. 14/527,697.

Liyang, Tang, et al. "A conceptual framework for business intelligence as a service (saas bi)." Intelligent Computation Technology and Automation (ICICTA), 2011 International Conference on. vol. 2. IEEE, 2011.

Memory Recall/Retrieval—Memory processes—The Human memory, http://www.lukemastin.com/humanmemory/processes_recall.html, Mar. 6, 2018.

Non-final Office Action dated Dec. 3, 2015 for related U.S. Appl. No. 14/527,697.

Notice of Allowance and Fee(s) Due dated Oct. 12, 2016 for related U.S. Appl. No. 14/527,697.

Tonellotto, Nicola, Craig Macdonald, and Iadh Ounis. "Efficient and effective retrieval using selective pruning." Proceedings of the sixth ACM international conference on Web search and data mining. 2013. (Year: 2013).

* cited by examiner

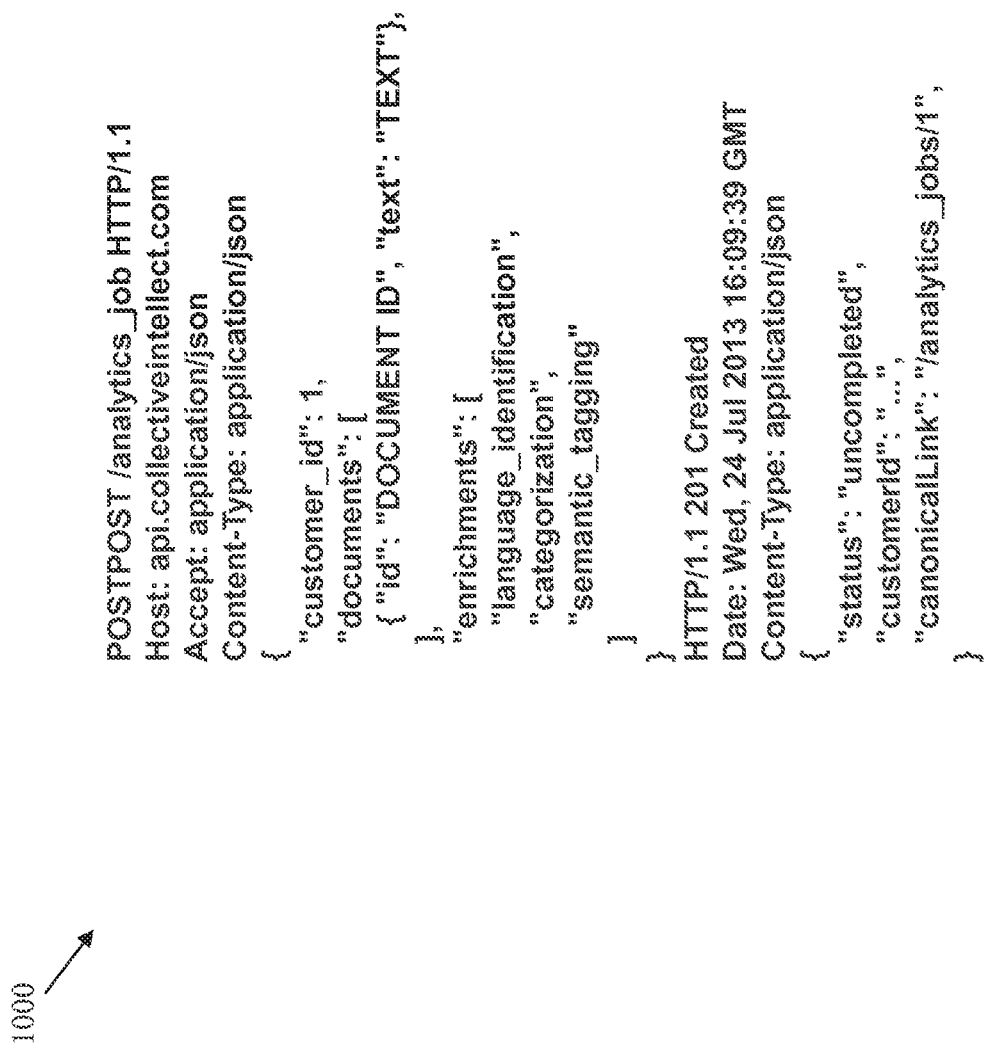

```
GET /analytics_job/1   HTTP/1.1
Host: api.collectiveintellect.com
Accept: application/json
HTTP/1.1 200 OK
Date: Wed, 24 Jul 2013 16:09:39 GMT
Content-Type: application/json
{
  "status": "completed",
  "customerId": "...",
  "documents": [
    {
      "id": "...",
      "theme": {
        "name": "Consumer Electronics"
      },
      "sentiment": {
        "name": "Positive",
        "value": 1
      },
      "languageTag": {
        "code": "zh-CN",
        "region": "China",
        "language": "Chinese"
      },
      "topics": [
        {
          "id": "TOPICID",
          "name": "iPod"
        }
      ],
      "indicators": [
        {
          "id": "DIMENSIONID",
          "name": "Favorable"
        }
      ]
    }
  ],
  "canonicalLink": "/analytics_job/1"
}
```

Figure 11

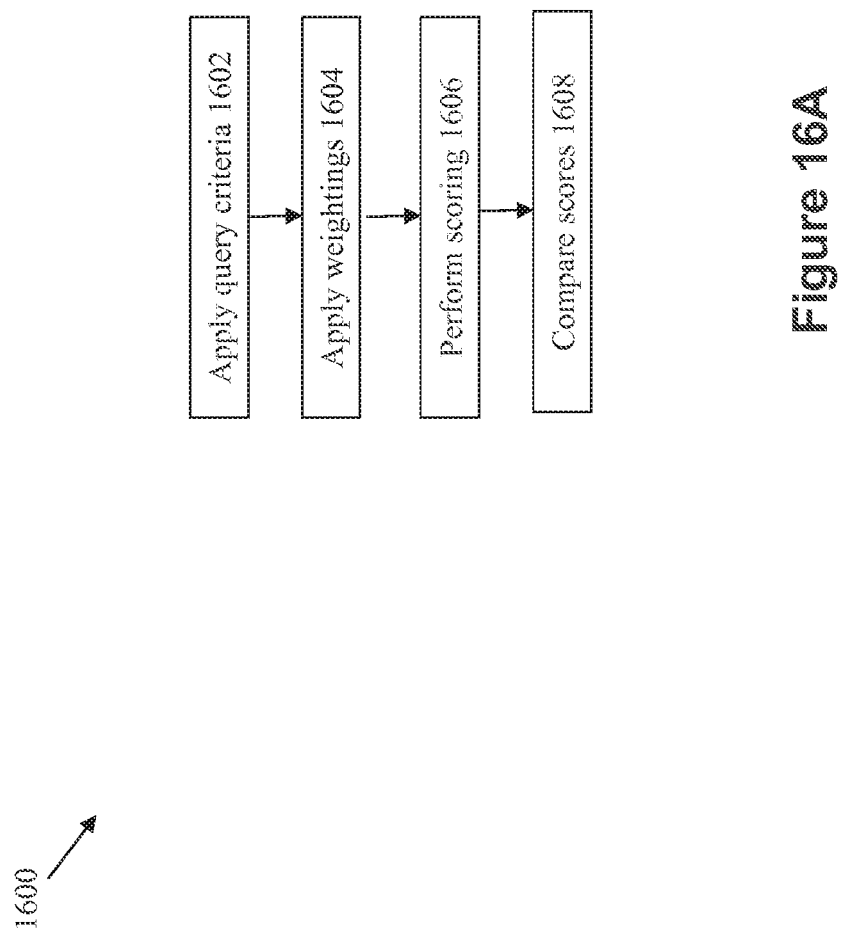

METHOD AND SYSTEM FOR IMPLEMENTING SEMANTIC TECHNOLOGY

INCORPORATION BY REFERENCE; DISCLAIMER

Each of the following applications are hereby incorporated by reference: application Ser. No. 14/815,692 filed on Jul. 31, 2015; application No. 62/031,771 filed on Jul. 31, 2014; application Ser. No. 14/815,714 filed on Jul. 31, 2015; application Ser. No. 14/815,737 filed on Jul. 31, 2015. The Applicant hereby rescinds any disclaimer of claim scope in the parent application(s) or the prosecution history thereof and advises the USPTO that the claims in this application may be broader than any claim in the parent application(s).

BACKGROUND

Many organizations receive communications from customers and other third parties during the course of a typical business day. These communications may take many forms, such as emails, letters, telephone calls, etc. The communications may pertain to a wide range of different topics directed to sales inquiries, customer complaints, product feedback, etc.

The organization (e.g., an enterprise, a community, a non-profit organization, or any other entity) may handle these communications by attempting to understand the content of the communications, and then deciding how the communications should be routed within the organization. The problem is that in many cases, a manual process is employed by the typical business to sort and then process the messages. Given the overwhelming quantity of such messages received by a typical large business, it is evident that a manual approach to process these messages can be quite tedious, inefficient, and does not scale very well for large organizations.

Automated processes have been used, but results of such automation tend to be hit or miss since conventional processes are often focused on the simple process of using keyword searching/matching. This approach can be very problematic if the message does not contain the appropriate keyword from a list of pre-programmed keywords, or if the keyword matched in the message pertains to a topic that does not accurately correspond to the true topic of the message.

Further, these messages need to be systematically routed to a desired endpoint within the organization. Often, this is difficult to achieve, due to various constraints on system architecture and compliance rules that are imposed on data routed to various organizations. Therefore, there is a need for an improved approach to analyze and process communications possessed by an enterprise, business, or organization.

Other additional objects, features, and advantages of the invention(s) are described in the detailed description, figures, and claims.

SUMMARY

One or more embodiments of the current application address the above problems by performing semantic analysis on a set of data associated with an entity. In one aspect, a method according to one or more embodiments, comprises receiving messages from a plurality of data sources, performing semantic analysis on the received messages to identify a semantic significance of the received messages, the semantic analysis performed by accessing a semantic space to vectorize the received messages, and analyzing the vectorized messages against one or more predefined topic vectors, and providing a routing infrastructure to route the semantically analyzed messages, wherein the routing infrastructure comprises a configuration database to determine a desired endpoint for the semantically analyzed messages, and a rules engine that accesses a rules database to determine a set of rules applicable to the semantically analyzed messages, and routes the semantically analyzed messages to the desired endpoint based at least in part on the determined set of rules for the semantically analyzed messages.

Further details of aspects, objects, and advantages of embodiments are described below in the detailed description, drawings, and claims. Both the foregoing general description and the following detailed description are examples only and explanatory, and are not intended to be limiting as to the scope of the disclosure.

BRIEF DESCRIPTION OF THE FIGURES

FIG. 10 provides an illustration of an example POST call.

FIG. 11 an illustration of an example GET call.

FIG. 16A shows a flowchart that provides more details of an example approach to apply user rules to the data.

DETAILED DESCRIPTION

Figure 1:
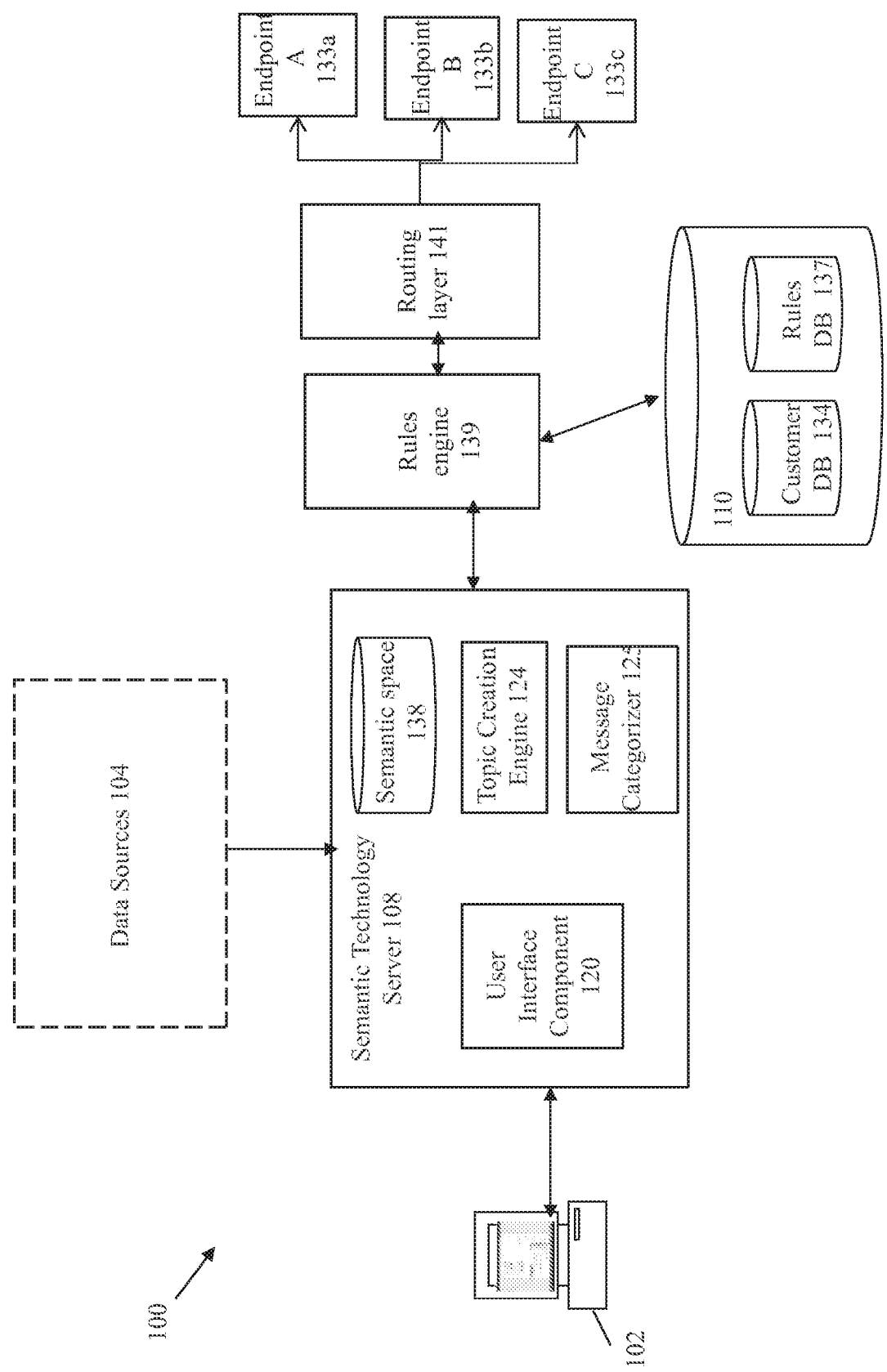
FIG. 1 illustrates an example system which may be employed in some embodiments of the invention(s).

Embodiments of the present invention(s) provide a system, method, and computer program product for allowing an entity to perform semantic analysis upon data of interest to an organization, and to automatically route the semantically analyzed data to endpoints desired by the organization. In one or more embodiments, the semantic analysis system performs semantic analysis on data received from a variety of sources, and uses a rules based mechanism to systematically route the semantically analyzed messages to desired endpoints. Some of endpoints may be external to the system, while other endpoints may be within the system. A rules-based routing infrastructure may be provided to facilitate analysis and routing of analyzed messages to the appropriate destinations. The routing infrastructure may comprise one or more connectors that receive data from various sources, databases that store rules that are applicable to data from the various sources and a rules engine that is configured to consult the various rules and route the data to the endpoints.

The present disclosure therefore provides great benefit to an entity to allow it to monitor the content of the communications, to identify a range of topics pertaining to the content of the communications, and to automatically route the communications to a designated endpoint. By knowing about and understanding these topics, the business can then act upon that information to identify actionable messages. For example, potential customers and possible sales leads may be identified or problematic situations that may require immediate involvement of customer service personnel may be identified based on the messages.

For example, consider a CRM (Customer Relationship Management) application, which is designed to facilitate the ability of a business to create, develop, and build relationships with its customers or potential customers. It would be very desirable to allow the business CRM application to stay informed of actionable message content, to identify potential customers, possible sales leads, and handle possible customer complaints and problems.

The present disclosure provides a mechanism for allowing data to be accessed by a semantic analysis system, regardless if the data pertains to data that is private to an enterprise or public data. In one or more embodiments, the semantic analysis system may be a SaaS platform that may perform semantic analysis to be consumed by one or more organizations on a subscription basis. For example, each customer of the semantic analysis system may be provided access to a dedicated portion of the platform such that semantic analysis parameters may be defined, and results may be viewed and analyzed, as will be described in further detail below. In other embodiments, data may be transmitted to the semantic analysis system through a semantic API, and the semantically analyzed data (e.g., enriched data) may simply be pushed back to the requesting organization.

The semantic analysis system may refer to a system that performs semantic analysis on a set of data associated with one or more entities or organizations. Semantic analysis is especially helpful in determining an underlying meaning and/or a context of terms used in language. Semantic analysis may refer to determining a semantic significance of words in the received set of data relative to the many other possible semantic dimensions of the words. Semantic significance may refer to a known meaning or context of a term. A term may have many meanings or semantic significances. Semantic analysis allows data to be parsed in a manner that is cognizant of one intended semantic significance of one or more terms while disregarding data that is unrelated to the intended semantic significance. Thus, the goal of semantic analysis is that the analyzed data will then be more relevant to the user, because the data corresponds to an underlying context or meaning desired by the user, while disregarding data that is unrelated to the meaning desired by the user even if it contains the same terms.

For example, a word may have many meanings or semantic significances associated with it. The same word may have various connotations, sometimes ones that are diametrically opposite to each other. These various meanings or dimensions may be represented mathematically by vectors, as will be described in further detail below. Consider a simple word, "bark." In one context, the word "bark" may be the verb that refers to a sound produced by dogs. In another context, the word "bark" may refer to a curt or angry response by a person. In yet another context, the word "bark" may refer to the outside covering of a tree. Thus, a single word may have multiple semantic significances. The goal of the semantic analysis system is to determine the semantic significance that most closely aligns with the semantic significance that is of interest to an entity.

Themes may be identified, for example, by performing semantic analysis and identifying semantic clusters within the analyzed data. The semantic clusters correspond to one or more themes within the data. For example, latent semantic analysis (LSA), an advanced form of statistical language modeling, can be used to perform semantic analysis upon the content. This permits the system to understand the contextual and semantic significance of terms that appear within the data. For example semantic analysis can be used to understand the difference between the term "Galaxy" used in the astronomy context, and "Galaxy" that is used to refer to the name of a professional soccer team.

To this end, and as will be described in greater detail below, the many semantic significances of one or more terms are represented as mathematical vectors. In the above example, the word bark, as in bark of a dog may be assigned a first semantic significance through a first mathematical vector (e.g., having a magnitude and direction), and the word bark, as in tree bark may be assigned another semantic significance through a second mathematical vector (e.g., having another magnitude and direction). In this way, mathematical vectors are assigned to a large bank of terms in a particular language (and the similar process is repeated for other languages), and stored for reference in order to determine the semantic significance of terms in received data.

In order to understand the semantic significance of words of interest to a particular entity, topics are created, in which a user associated with the entity defines the semantic significance of one or more terms of interest. In doing so, the user is essentially selecting one or more mathematical vectors over other mathematical vectors associated with a term (e.g., choosing "bark" as in tree bark, over "dog bark"). Topics can be created, which provides an approach to capture the scope of a given set of subject matter. The topic definitions can then be used, for example, to automatically classify data, e.g., by determining whether a given message/post falls within the topic definition. Based at least in part upon performing semantic analysis, themes may be identified within the data.

In order to perform semantic analysis on the data received from the entity, the mathematical vectors of terms in the received data are compared to mathematical vectors associated with created topics, in order to semantically categorize the data based on topics or terms that are of specific interest to the user. The following disclosure will go through various embodiments of how semantic analysis is performed and routed to desired endpoints.

FIG. 1 illustrates an example system 100 which may be employed in some embodiments of the invention(s). The system includes one or more users at one or more user stations 102 that operate the system. The user station 102 comprises any type of computing station that may be used to operate or interface with the applications in the system. The user station 102 may be associated with a customer of the semantic analysis system, in one or more embodiments. In other embodiments, the user station 102 may be associated with a system administrator of the semantic analysis system. Examples of such user stations 102 may include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system 100, such as a mouse or keyboard to manipulate a pointing object in a graphical user interface to generate user inputs.

A semantic technology server 108 receives data from one or more data sources 104. In one or more embodiments, the data may be associated with an entity. In one or more embodiments, an entity may refer to a business. The business may be an enterprise or business organization that is engaged in an activity (e.g., selling of goods or services, etc.) for profit. The enterprise may be a large business organization (e.g., having more than 1000 employees, etc.) The enterprise may refer to any undertaking by an individual or group of individuals for profit. In one or more embodiments, the enterprise may be a business unit or firm (e.g., law firm). The enterprise may be a corporation, in one or more embodiments. In one or more embodiments, the entity may refer to a small business (e.g., having less than 1000 employees). The enterprise may deal with goods or services in any area (e.g., software, pharmaceuticals, engineering, manufacturing, etc.)

In other embodiments, the entity may refer to a non-profit organization. The non-profit organization may be an organization that uses surplus revenues to achieve a purpose or mission rather than using the revenues for profit. The entity may refer to any type of non-profit organization having any number of employees. In other embodiments, entity may refer to a government agency. The government agency may be a local governmental agency, a state government agency, a federal agency or even some international government agency. The government agency may provide may be a permanent or semi-permanent organization in a government that is responsible for oversight and administration of specific functions. The government agency may have any number of employees.

The entity may refer generally to any organization comprise a plurality of people, such as an institution that has a collective goal. In one or more embodiments, the entity may be an individual (e.g., a solo business owner, etc.). In one or more embodiments, an entity is a customer or tenant of a system that serves one or more tenants or one or more customers and offers services to employees or user accounts for the customer or tenant.

The data may be collected through a plurality of data sources. Such data sources 104 include, for example, enterprise data comprising private communications from within a business.

In one or more embodiments, the semantic technology server 108 is a software-as-a-service ("SaaS") platform that may be provided to one or more organizations or entities. The semantic analysis platform may take in private and public data and semantically analyze the data based on topics of interest to the organization. In other embodiments, the semantic technology server 108 may be provided on-site for a particular organization or enterprise.

As shown in FIG. 1, the semantic technology server 108 may receive data from a plurality of data sources 104. In one or more embodiments, the data sources may be data that is private to an enterprise. In other embodiments, the data sources may be public data sources (e.g., social media data, community data, etc.). In one or more embodiments, enterprise private data refers to data corresponding to communications within a business. The enterprise private data may be associated with messages and responses from one or more employees, for example. For example, an enterprise call center may produce many messages private to an organization that needs to be processed. Or, in another example, enterprise data may refer to data collected from an enterprise social media system. Or, in another example, enterprise data may refer to data collected from social networks that the entity has one or more accounts in. In one or more embodiments, enterprise data may be any data owned by the enterprise. It should be appreciated that public data may be similarly used, in one or more embodiments.

Enterprise community data may also be provided to the system from hosted customer communities, such as for example, data from Jive or Lithium. The data sources 104 may also include public data sources, such as social media sources, a social network, blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types. It is noted that while the currently described embodiment describes analysis of these specific types of data, the inventive concepts are applicable to analysis of other types of content as well.

Semantic analysis is performed upon the data received from various data sources by the semantic technology server 108. The semantic technology server 108 may be implemented as a stand-alone semantic analysis tool, or can be included as a component within another tool, e.g., a social relationship management tool.

In some embodiments, the semantic technology server 108 comprises a topic creation engine 124 to create topics with respect to the data (e.g., social media data, enterprise data, etc.) received from the various data sources. The topic creation engine 124 processes the data using semantic analysis to identify themes within the data. The identified themes are used to create definition parameters for a new topic, e.g., by adding semantic filters that pertain to the identified themes. In operation, the topic creation engine 124 may access a semantic space 138 to perform the themes analysis. The topic definitions created using the topic creation engine 124 may be stored in a configuration database 134.

The semantic technology server 108 also comprises a message categorizer 125. The message categorizer performs message categorization to analyze the content of the data from the data sources 104.

A user interface component 120 generates the content that is visually displayed to a user (e.g., a user associated with a customer, a system administrator, etc.) at user station 102. The user interface component 120 may also be used to retrieve user inputs through the user interface to control the operations of the topic creation engine 124 and/or message categorizer 125.

As shown in FIG. 1, the semantic technology sever 108 may be coupled to a rules engine 139 that receives the semantically analyzed messages categorized by the message categorizer 125. The rules engine may access the configuration database 134 and/or a rules database 137 to determine how to route the semantically analyzed messages to one or more endpoints 133 (e.g., 133a, 133b, 133c). In one or more embodiments, a routing layer 141 may be used to apply routing rules to the data that is to be delivered to the various endpoints 133. This routing infrastructure advantageously allows data (e.g., private data, public data, etc.) to be routed to the appropriate endpoint.

The configuration database 134, semantic space 138, and/or analysis results can be stored in a computer readable storage device 110. The computer readable storage device 110 comprises any combination of hardware and software that allows for ready access to the data that is located at the computer readable storage device. For example, the computer readable storage device 110 could be implemented as computer memory operatively managed by an operating system. The computer readable storage device could also be implemented as an electronic database system having storage on persistent and/or non-persistent storage.

Any of the components/servers in the above-described system may include a bus or other communication mechanism for communicating information, which interconnects subsystems and devices, such as processor, system memory (e.g., RAM), static storage device (e.g., ROM), disk drive (e.g., magnetic or optical), communication interface (e.g., modem or Ethernet card), display (e.g., CRT or LCD), input device (e.g., keyboard, touchscreen). The system component performs specific operations by the processor executing one or more sequences of one or more instructions contained in system memory. Such instructions may be read into system memory from another computer readable/usable medium, such as static storage device or disk drive. In alternative embodiments, hard-wired circuitry may be used in place of or in combination with software instructions to implement the invention(s). Thus, embodiments of the invention(s) are not limited to any specific combination of hardware circuitry and/or software. In one embodiment, the term "logic" shall mean any combination of software or hardware that is used to implement all or part of the invention(s).

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive. Volatile media includes dynamic memory, such as system memory. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention(s), execution of the sequences of instructions to practice the invention(s) is performed by a single computing system. According to other embodiments of the invention(s), two or more computing systems coupled by a communication link (e.g., LAN, PTSN, or wireless network) may perform the sequence of instructions required to practice the invention(s) in coordination with one another. The system component may transmit and receive messages, data, and instructions, including program, i.e., application code, through communication link and communication interface. In one or more embodiments, received program code may be executed by the processor as it is received, and/or stored in disk drive, or other non-volatile storage for later execution.

Figure 2:
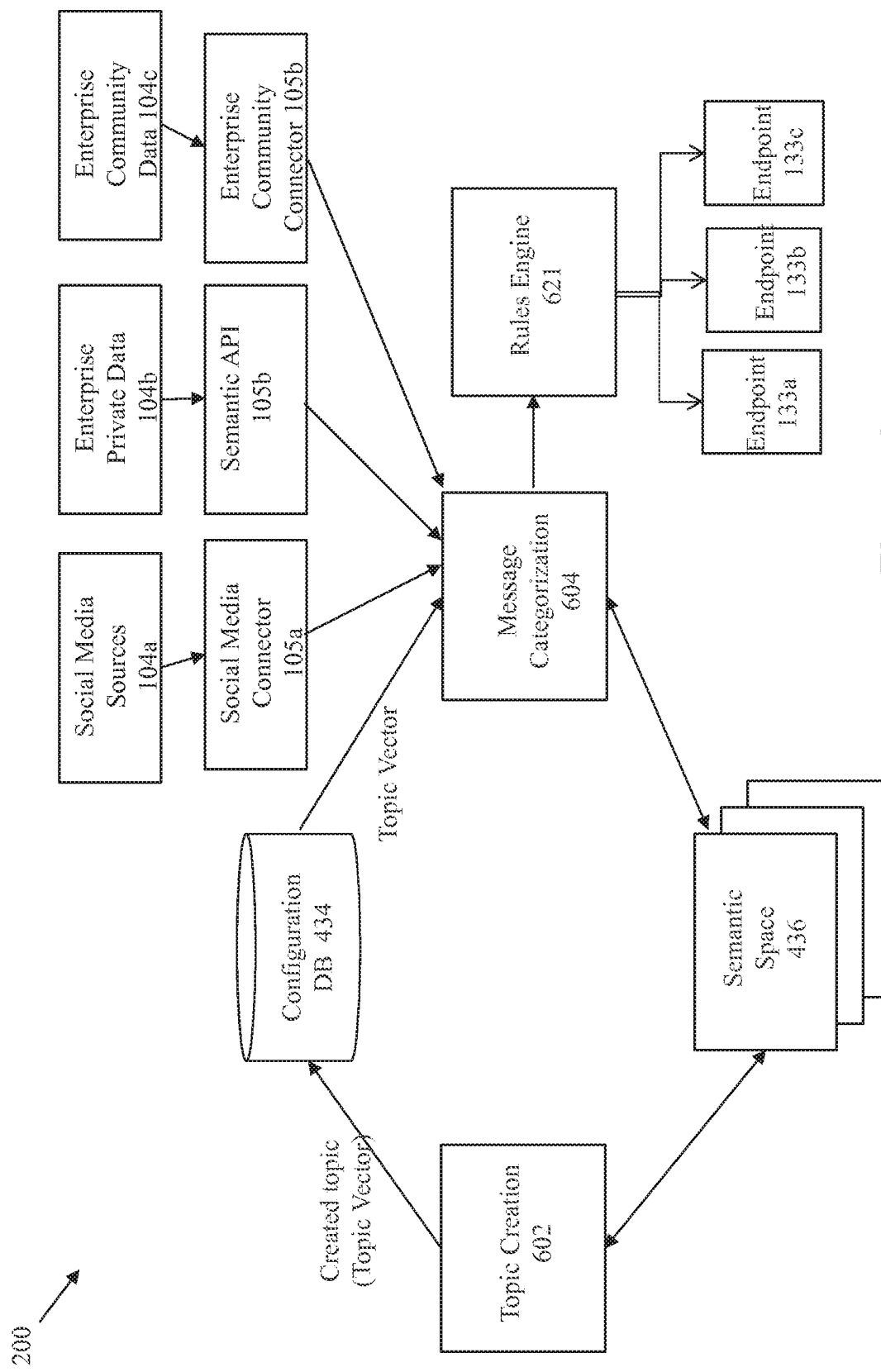
FIG. 2 illustrates an example system that performs topic creation and message categorization according to some embodiments of the invention(s).

FIG. 2 illustrates an example system 200 that performs topic creation and message categorization according to some embodiments of the invention(s). A topic creation mechanism 602 can be used to create a new topic, which is saved into the configuration database 434. A message categorization mechanism 604 accesses the topic vectors for the created topics, and uses the topic vectors to identify topics within data from social media sources. The categorized messages are then passed to one or more downstream systems. As shown in FIG. 2, the message categorization mechanism 604 may feed into a rules engine 621 that directs the semantically analyzed messages to a plurality of endpoints 133.

As noted above, the data processed by the system may be from any data source, including public social data, enterprise private data, and/or enterprise community data. One or more connectors 105a can be built to interconnect with the social media data sources 104a. These connectors may be built using APIs provided by the social media sites to access the data on those sites. In a similar way, one or more connectors 105c can be built to interconnect with the sites that host enterprise community data 104c.

With private enterprise data 104b, a more flexible framework can be provided to allow organizations to themselves provide data to be processed by the system. In some embodiments, a semantic API 105b is provided to enable organizations to call into the system to load the private data. This approach therefore avoids the requirement to build a custom connector for each and every enterprise that seeks to load its data for processing.

Figure 3:
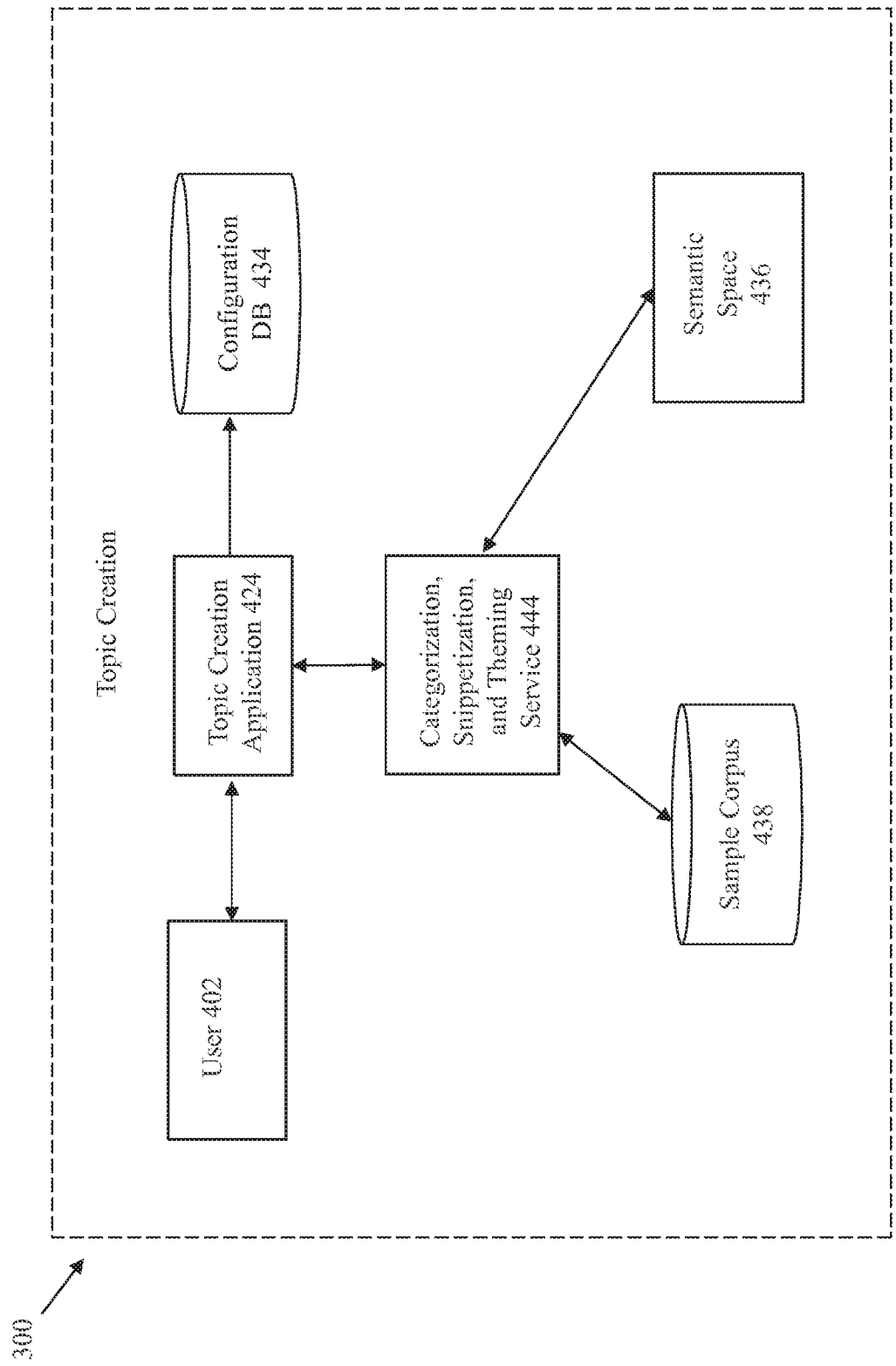
FIG. 3 illustrates an example architecture that can be used to perform topic creation according to some embodiments of the invention(s).

FIG. 3 illustrates an example architecture 300 that can be used to perform topic creation according to some embodiments of the invention(s). A topic creation mechanism/application 424 is used by a user 402 to create the new topic. The topic creation mechanism/application comprises any combination of hardware/software that is configured and/or programmed to perform the actions specified herein. New topics created by the topic creation mechanism/application 424 can be stored into a configuration database 434. In one or more embodiments, the configuration database 434 may store topics associated with a plurality of customers of the sentiment analysis system. In other embodiments, each customer may be associated with a separate configuration database 434. The following embodiments will focus on a single configuration database 434, but it should be appreciated that other variations may also be similarly implemented.

The topic creation mechanisms/application 424 interfaces with a categorization, snippetization, and theming service 444. The service 444 provides functionality to perform categorization of a given set of content using semantic analysis. The analysis may be provided over the full content of a data item, or may instead be applied to a "snippet" from the data comprising a more targeted subset of the data. Theme identification of the data may also be performed by service 444. While these functions are described in conjunction with a single service 444 in FIG. 3, it is noted that any number and/or combination of one or more components/services may be utilized in practice to accomplish the described functions.

The service 444 may access a sample corpus 438 to perform its functions. The sample corpus 438 comprises a collected set of data from which the desired analysis is to be performed. In some embodiments, the sample corpus 438 comprises a rolling three month window of collected data. In other embodiments, the sample corpus 438 may comprise sample data particular to each customer of the semantic analysis system. This may be important in order to capture the appropriate context and/or meaning of a topic as used by the customer organization. In other embodiments, a common sample corpus having a variety of data types may be used for a plurality of customers.

A semantic space 436 is accessed to perform semantic analysis upon data from the sample corpus 438. The semantic space 436 comprises a collection of vector values for a number of dimensions that are identifiable for terms within the data to be analyzed. These vector values are usable to understand the actual meaning of terms when used in different contexts. Mathematical computation and comparison of the term vectors allows one to determine the semantic significance or underlying meaning of various themes and documents. In one or more embodiments, a common semantic space may be used for a plurality of customers. In other embodiments, a dedicated semantic space may be employed for each customer. In other embodiments, especially for language identification or language-based semantic analysis, a different semantic space may be accessed based on a desired language.

Figure 4:
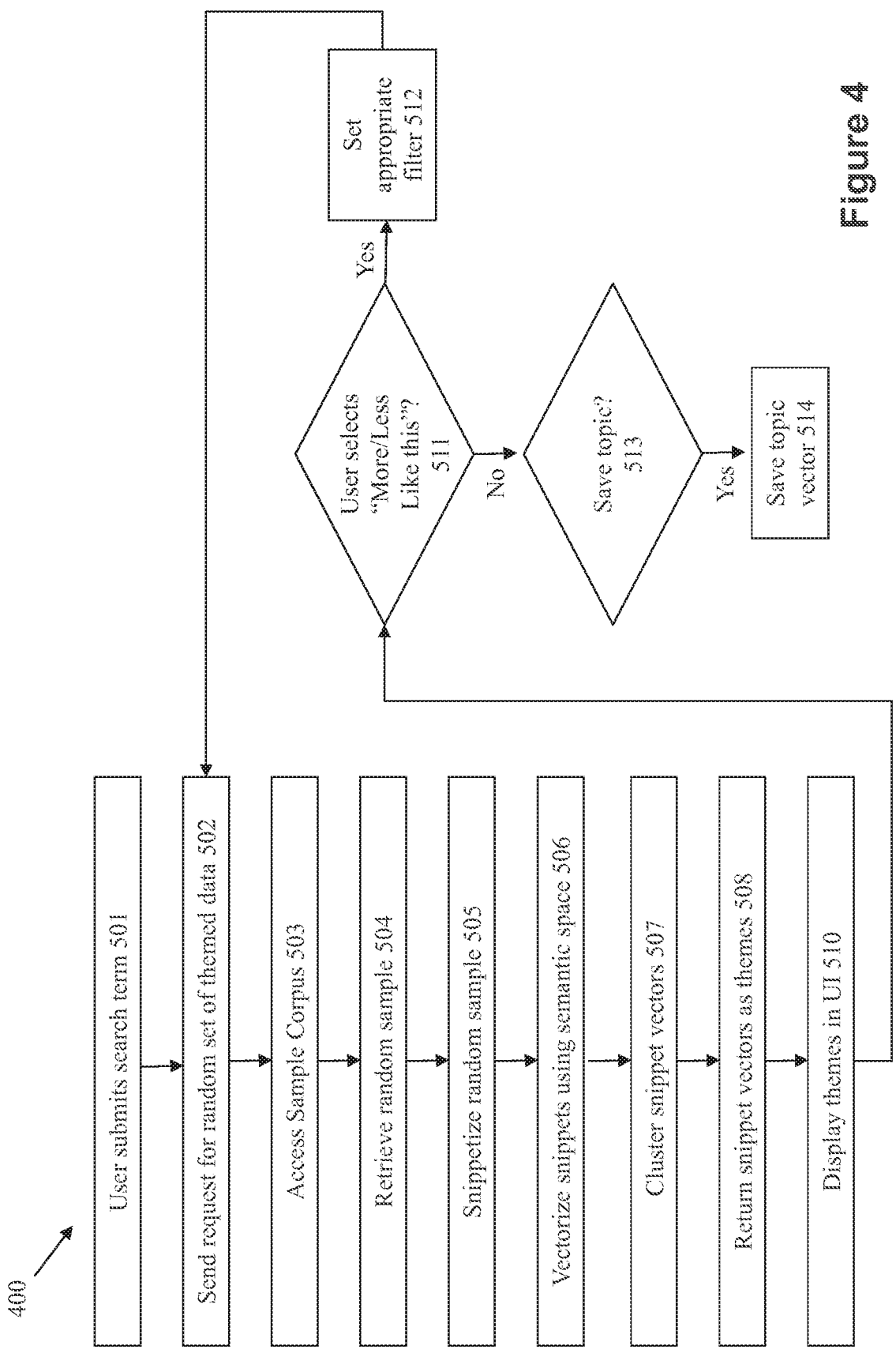
FIG. 4 shows a flowchart describing how the architecture of FIG. 3 is usable to perform topic creation.

FIG. 4 shows a flowchart 400 describing how the architecture of FIG. 3 is usable to perform topic creation. At 501, the user submits an initial search term from the user interface to the topic creation mechanism/application 424.

Next, at 502, the topic creation mechanism/application 424 sends a request for a random set of themed messages to the service 444. The request is for a random set of the data. The general idea is that, instead of performing analysis upon the entirety of the data, the analysis can be performed for a selected sampling of the data. Assuming that the samples are properly extracted from the underlying content with adequate randomness, the sampled data should provide a reasonably representative sample of data for the analysis. For example, a sample size of 500-1000 can be retrieved in some embodiments to perform the sampling. In an alternative embodiment, sampling is not employed—this approach analyzes all of the underlying content.

At 503, the service 444 accesses the sample corpus 438 to obtain a random selection of messages using the initial search term. The selection may be performed by using the search term to perform a keyword/Boolean query against the data within the sample corpus 438.

At 504, a random sample of messages is returned to the service 444. Next, at 505, the random sample of messages is snippetized into "snippets". The snippet may not be the entirety of the message content. Instead, the snippet may only contain a given number of words on either side of the occurrence of the word/topic of interest ("anchor term") within the content. For example, if the search term of interest is "Galaxy", then snippets can be created that extend 200 words in either direction from any suitable occurrence of that word within the message content. Grammatical boundaries may also be used to define the extent of a snippet, e.g., by using sentence or paragraph boundaries to adjust the cut-off point for a snippet.

One reason for using snippets instead of the entire message content is because this approach may provide a much more accurate assessment of the meaning/context or a document. For example, consider if the search term is the term "Galaxy", where only a very small portion of the message actually pertains to that term. If a snippet is identified which is centered around that term, and only that snippet of the message is semantically analyzed, then it is likely that the semantic analysis will produce a relatively accurate semantic understanding for how that terms is used in the message. On the other hand, if the entirety of the message is semantically analyzed instead, and the vast majority of the message is focused on a different subject matter from that term "galaxy", then it is possible that the semantic meaning of how the term is used may be obscured by the overwhelming weight of the rest of the message which has no pertinence to that term.

At 506, the snippets that correspond to the random sample of messages are vectorized using the semantic space 436. The semantic vectors are created across a number of dimensions for the term vectors (e.g., across 300 dimensions). The semantic vectors are mathematical representations of the semantic significance of one or more terms of interest to a user. The vectorized topics are analyzed against the vectorized messages to determine whether they can be categorized for that topic, as will be discussed below.

The vectorization is performed for all of the words within the snippets. In other words, a vector is obtained for each word in the snippet. The vectors for a given snippet are averaged together to obtain a single, overall vector for the snippet. This provides a mathematical value for the context/meaning of that snippet.

At 507, snippets are clustered together, where vector comparisons are performed so that snippets having similar vectors are clustered together. Clustering may be performed, for example, by using the KMeans++ approach to clustering.

A given cluster of vectors corresponds to a single theme. Therefore, at 508, the clustered snippets are returned as themes. At 510, the themes are displayed to the user in a user interface. The user interface includes interface elements to permit the user to select one or more of the themes to create semantic filters.

At 511, a determination is made whether the user has selected any of the themes for a new semantic filter. For example, a determination is made whether the user has selected a "More Like This" or "Less Like This" button for a given theme. If so, then at 512, a new semantic filter may be created. The actions starting from 502 may be repeated to obtain a new set of search results that accounts for the new semantic filter.

At 513, a determination is made whether the user desires to save the new topic. If so, then the topic vector is saved at 514. In one or more embodiments, the average of the vector(s) of the selected themes forms the value that corresponds to a topic vector that is saved for the new topic. This topic vector may then be saved into the configuration database 434.

Figure 5:
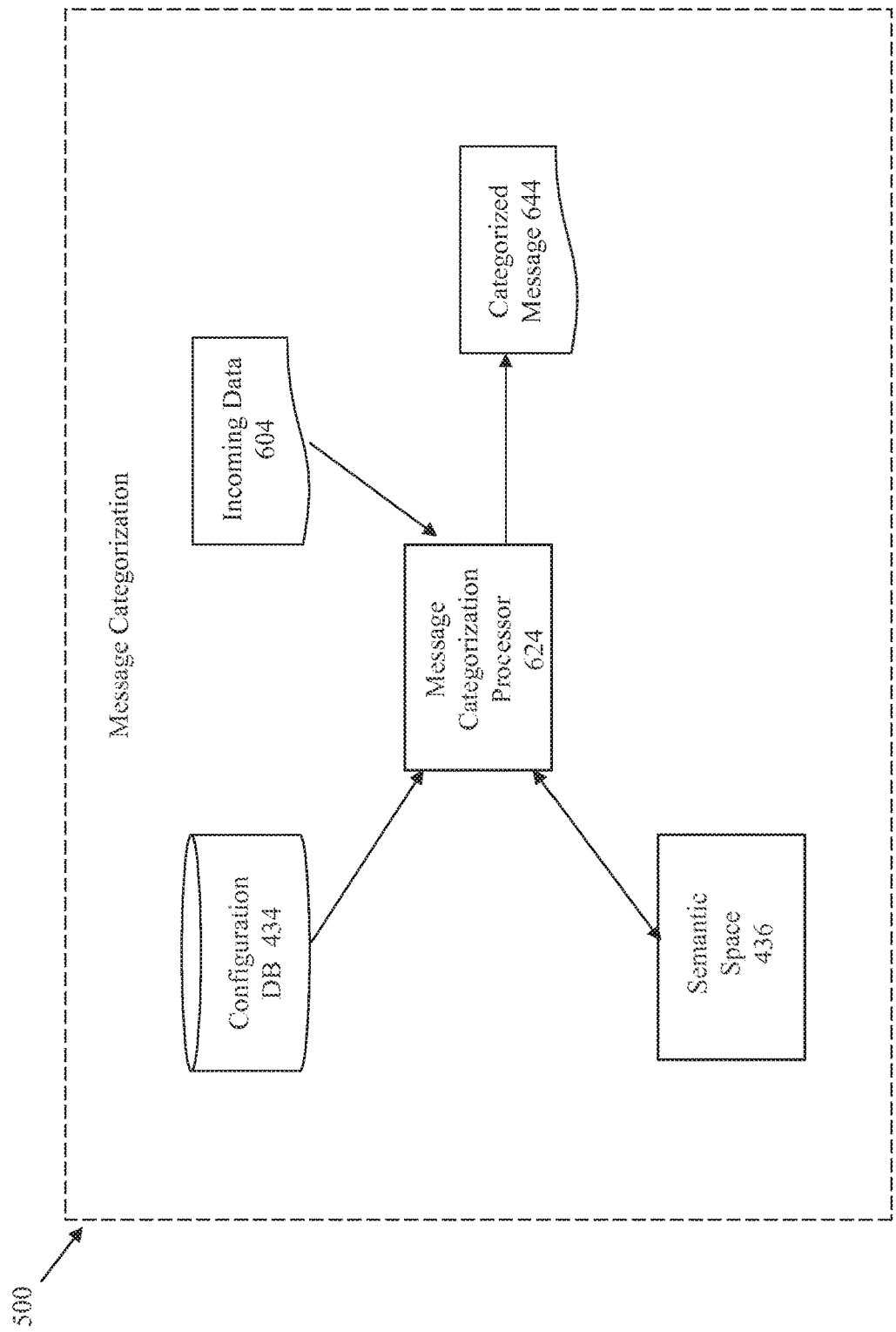
FIG. 5 illustrates an architecture of a system for performing message categorization.

FIG. 5 illustrates an architecture 500 of a system for performing message categorization. A message categorization processor 624 receives incoming data 604 from one or more sources. The message categorization processor 624 also receives topic vectors from the configuration database 434.

The message categorization processor 624 can be implemented as a pipeline processing mechanism, comprising a number of pipeline stages for the processing of data. One of the pipeline stages may pertain to categorization of messages. Other pipeline stages may be employed to perform other functions, such as spam processing, deduplication, sentiment analysis, and term analysis.

It should be appreciated that data from private sources may need to be handled differently from public social data, especially when a common multi-tenant system is used to handle data from multiple private and/or public sources.

In one embodiment, a separate pipeline processing mechanism is provided for each private source of data. In this approach, a first enterprise will use its own first private pipeline processing mechanism to perform message categorization on its private messages, and a second enterprise will use a second private pipeline processing mechanism to perform message categorization for its separate private messages. The possible problem with this approach is that, in a multi-tenant system, this approach may be quite expensive and may not be easily scalable.

In an alternate embodiment, common pipelines may be used to process the data from multiple sources. However, unique identifiers may be used to handle the messages differently from the different sources. In this approach, topics created by each enterprise are associated with that enterprise by using an identifier (e.g., customer ID) associated with that enterprise. In addition, private messages from that enterprise are also associated with the same identifier/customer ID. As the private messages are processed through the common pipeline, the unique identifier associated with the private messages is used to load topics specific for that enterprise (which are identified since they are associated with the same identifier). The private messages are then categorized using those topics, and are routed to the appropriate destination after categorization.

For message categorization, the message categorization processor 624 utilizes the semantic space to vectorize the message content. A comparison is performed against the topic vectors to identify one or more topics that may be associated with the message content. If any topics are identified, then the message content can be annotated and/or tagged to identify the topic. Thereafter, the categorized content 644 is released for downstream usage or storage, e.g., to be viewed using a dashboard tool or for routing to a downstream application such as a CRM (customer relations management), HR (human resources), or marketing application.

It may be the case that a single semantic space 436 is not sufficient to handle message categorization for multiple enterprises. This is because the terminology of interest to a first enterprise may not be of interest to a second enterprise. For example, the term "Galaxy" may have a first meaning to a company in the mobile phone space but have an entirely different meaning to a company in the sporting equipment/apparel space. Therefore, one approach (as briefly discussed above) may be to provide a separate semantic space 436 for each customer (as needed). This approach may be initiated by checking if the common semantic space is usable, and if not, to then create the new semantic space once the need has been identified.

Figure 6:
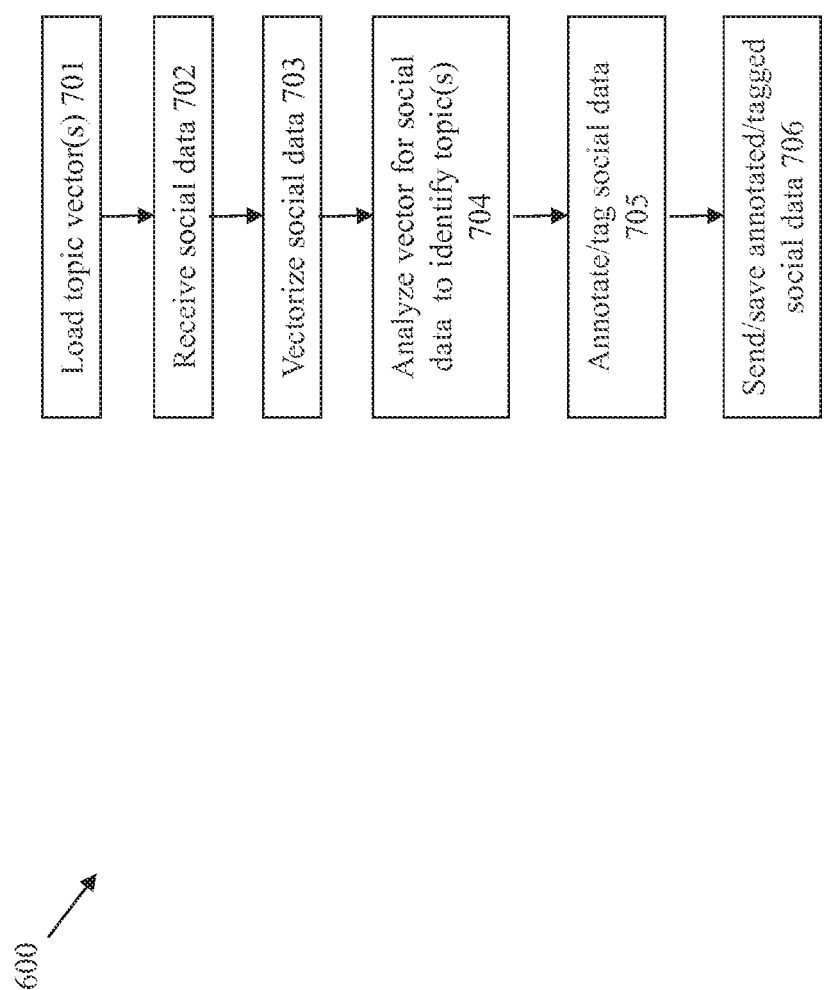
FIG. 6 illustrates a flowchart of an approach for performing message categorization using the architecture of FIG. 5.

FIG. 6 illustrates a flowchart 600 of an approach for performing message categorization using the architecture of FIG. 5. At 701, the message categorization processor 624 loads topic vectors from the configuration database 434 for any created topic(s). In a commercial setting, these topic vectors pertain, for example, to any topics/dimensions set up by a user for a given brand and/or product. In this context, the topics comprise a given brand or product name. The dimensions may pertain to consumer intent, interest, or psychographics.

At 702, an item of social media content (e.g., a message) is received by the message categorization processor 624. At 703, the message is vectorized. The semantic space 436 is accessed to vectorize the message to create a message vector.

At 704, the message vector is analyzed relative to the topic vector(s). In one or more embodiments, this may be performed, for example, by calculating the cosine of the message vector against each topic vector. The similarity of the message vector to the topic vector is computed by calculating this cosine value, to check for one of the following:

Identical meaning: value of cosine=1
Unrelated meaning: value of cosine=0
Opposite meaning: value of cosine=−1
A threshold distance to any of the above values
A message that relates to one of the created topics would correspond exactly or generally to the appropriate cosine value from performing the calculations. One or more thresholds may be configured for the cosine values to determine whether or not the message matches to a topic.

At 705, any message that is identified as being associated with a given topic can be annotated and/or tagged to indicate the association. Thereafter, at 706, the annotated/tagged message exits the message processor 624 to a downstream location.

Essentially, the semantic analysis system loads one or more topic vectors, vectorizes the messages received from various sources, and compares the vectorized messages against one or more topic vectors. A few methods of analysis have been discussed above. In one or more embodiments, a similarity between the topic vector and the vectorized messages is determined. If the similarity degree is deemed to be sufficient, the vectorized messages are categorized for that topic. In one or more embodiments, the vectorized message may be annotated with the topic vector.

Figure 7:
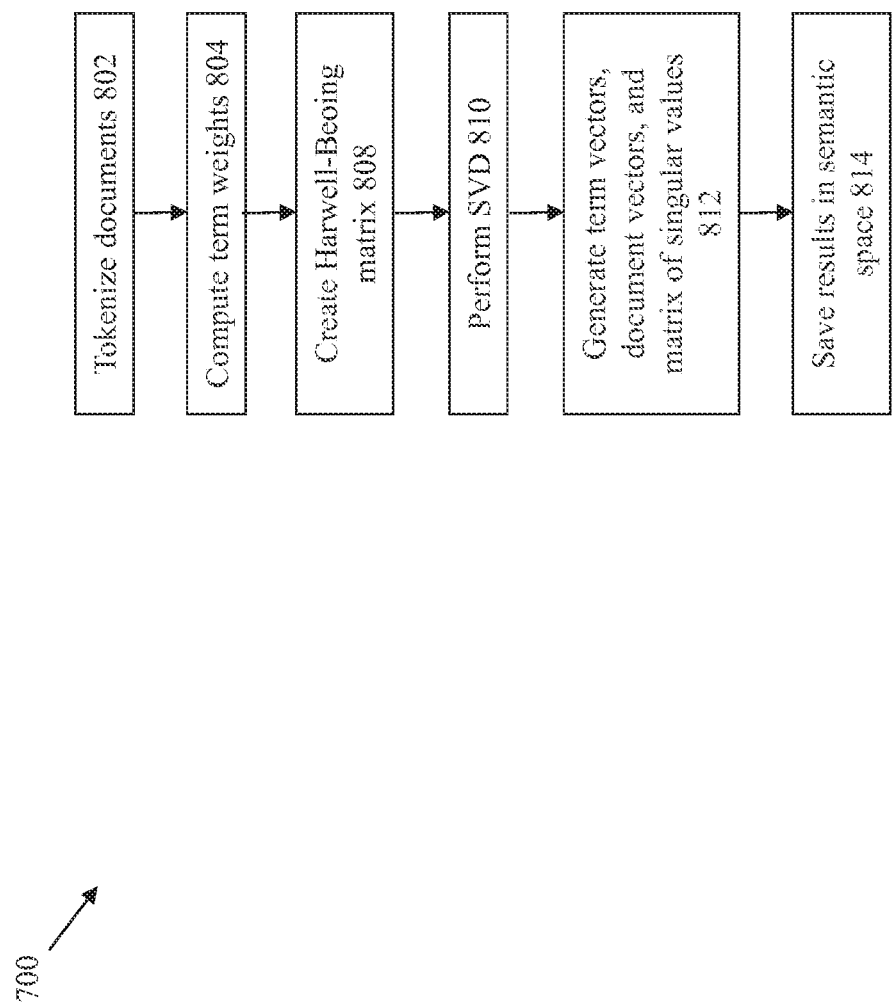
FIG. 7 shows a flowchart of an approach to create a semantic space according to some embodiments of the invention(s).

FIG. 7 shows a flowchart 700 of an approach to create a semantic space according to some embodiments of the invention(s). The general overview is that a learning model may be implemented to represent terms as high-dimensional vectors within the semantic space. Singular value decomposition (SVD) may be employed to reduce a matrix of terms into a set of multidimensional vectors.

At 802, incoming documents are tokenized. This action is performed in some embodiments by (a) normalizing punctuations, (b) identifying co-locations; and (c) removing stop words. Stop words to be removed may include, for example, "and", "or", "the", "to", "be", "is", "at".

At 804, term weights are computed for the tokenized content. A global frequency is computed for the terms. In addition, a global weight (e.g., entropy) is computed for the terms. The terms can also be sorted at this stage.

At 806, a matrix of the terms is created. The matrix can be formed with content passages as rows and words as columns, where cells contain the number of times that a given word is used in a given passage. The cell values are transformed into a measure of the information about the passage identity the carry. The matrix can be formed as a Harwell-Boeing matrix.

In some embodiments, the matrix is formed using the following example process:
For each document d
For each term t
Create a Cell value using the global weight;
It should be appreciated that other approaches may be used to create the matrix, and the foregoing approaches are provided for illustrative purposes only.

At 808, singular value decomposition is applied to represent the words and passages as vectors in a high dimensional semantic space. At 810, the process generates (a) term vectors, (b) document vectors, and (c) diagonal matrix of singular names. The results are saved, at 812, into the semantic space.

As noted above, an API (referred to herein as a "semantic API") can be used to provide external enterprise data into the semantic analysis system. This implements semantic operations to expose semantic abilities to others through the API-based interface. In some embodiments, the interface comprises a RESTful API in JSON, and is implemented using HTTP Basic over SSL.

Figure 8:
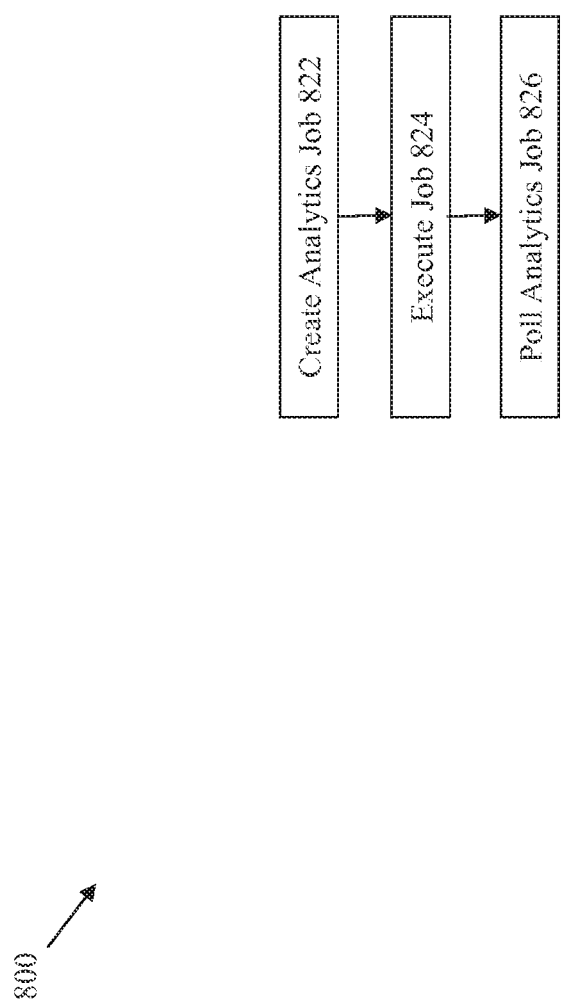
FIG. 8 shows a flowchart of an approach to implement this approach according to some embodiments of the invention(s).

FIG. 8 shows a flowchart 800 of an approach to implement this approach according to some embodiments of the invention(s). At 822, the process begins by creating an analytics job in the system using the API. In some embodiments, the analytics job comprises a document set having one or more documents, where each document includes an ID and some text.

The job may also include a list of one or more enrichments to be implemented for the document processing. Examples of such enrichments include language identification, categorization, semantic tagging, sentiment analysis, and theming. Language identification pertains to the functionality of identifying a language or the document. Categorization refers to the process described above to identify a topic for the document. Themes refer to the process of performing theme identification for the document. Sentiment analysis refers to the process of identifying a sentiment (e.g., tonality) for the document. Semantic tagging refers to the categorization of semantic indicators for the document.

At 824, the job is then executed to be run by the system. It should be appreciated that the semantic analysis detailed above may be used on the provided document set in order to provide the enrichments back to the requesting organization. The document set, if loaded, and the individual documents are then processed by the system. At 826, the analytics job is polled until the status of the job indicates that is has been "processed".

Figure 9:
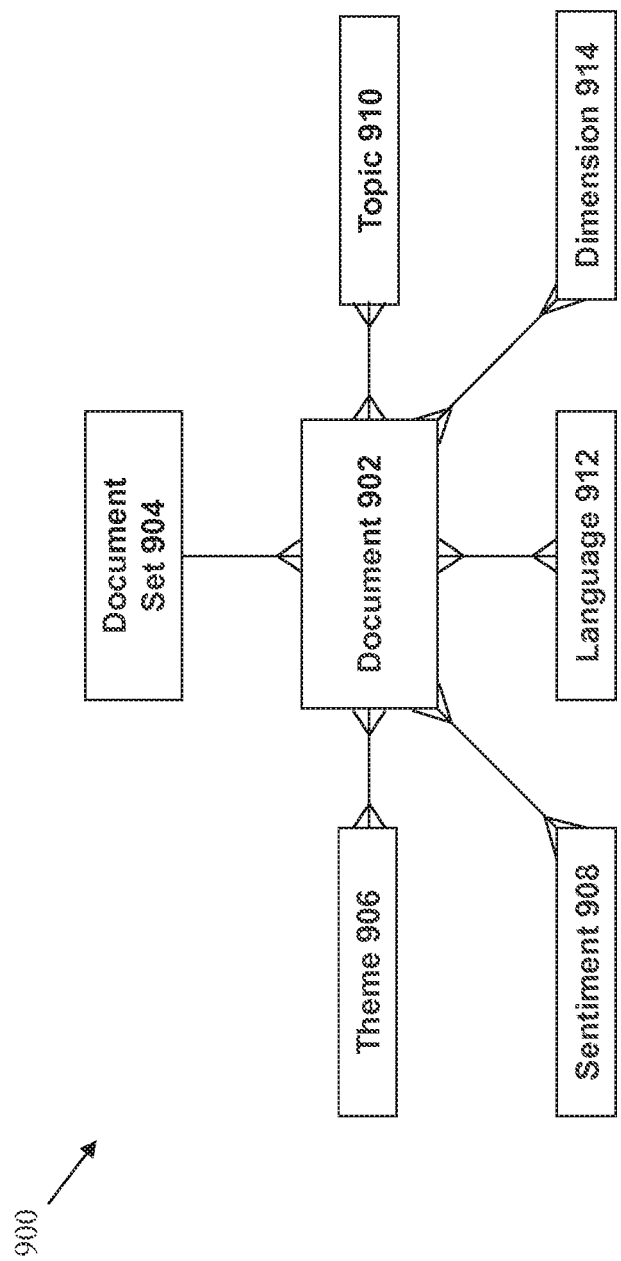
FIG. 9 provides a conceptual view of the documents to be processed by the analytics job through the semantics API.

FIG. 9 provides a conceptual view 900 of the documents 902 to be processed by the analytics job through the semantics API. In this embodiment, the API is oriented towards a set of documents. The set of documents may be, for example, a set of emails and/or messages of an enterprise. As shown in FIG. 9, the document set 904 may comprise individual documents 902 that are to be processed by the semantic analysis system. In one or more embodiments, the enterprise may also request a set of enrichments to be performed on the data (e.g., a type of sentiment, a range of data, one or more themes, etc.)

Each document 902 may undergo processing corresponding to desired enrichments. As shown in FIG. 9, the enrichment may relate to identifying one or more themes 906 in the document 902. In one or more embodiments, the enrichment may pertain to analyzing a sentiment 908 in the document 902. In one or more embodiments, the enrichment may pertain to identifying a language 912 in the document 902. In other embodiments, the enrichment may pertain to identifying topics 910 in a document 902. In yet other embodiments, the enrichment may relate to determining dimensions 914 in the document 902. Other examples of enrichments may include language identification, categorization, semantic tagging, sentiment analysis, and theming.

A POST call can be made to create the job, and to specify the documents and/or operations for the job. The POST call may also detail the type of enrichments desired by the customer or enterprise. FIG. 10 provides an illustration 1000 of an example POST call (showing an example of what the customer may request for the processing). As shown in the illustrative embodiment of FIG. 10, the POST call 1000 may identify the host API (e.g., "api.collectiveintellect.com"), define one or more content types and respective identification (e.g., "customer_id", "documents", etc.), and also request a set of enrichments (e.g., "language_identification," "categorization," etc.).

Referring now to FIG. 11, a GET call can be made to get the analytics job from the semantic analysis system, including the annotated documents (e.g., with enrichments) that have been processed. FIG. 11 is an illustration 1100 of an example GET call (showing examples of what the customer may receive in response to the POST call). As shown in FIG. 11, the GET call 1100 may not only include the host API (e.g., "api.collectiveintellect.com"), but may also include the results of analysis (e.g., "language": "Chinese", "sentiment": "positive", etc.). In other words, by using the semantic API, various entities (e.g., enterprises, organizations, individuals, etc.) may provide the system with data to be analyzed through the semantic API (e.g., through a POST call), and may simply receive the results of the analysis through the API (e.g., through a GET call).

In one or more embodiments, a copy of the analysis may be stored in a local database of the semantic analysis system. In other embodiments, the documents along with the analysis are simply sent back to the enterprise requesting the analysis through the semantic API, and no copy of the documents or the messages are stored in the semantic analysis system.

More pertinent to the current invention(s), semantically analyzed data (e.g., data that is annotated and/or enriched) is routed to one or more endpoints such that it can be consumed by customers of the semantic analysis system. In one or more embodiments, the semantic analysis system may follow a SaaS model, allowing various entities or customers (e.g., enterprises, organizations, individuals, or any other entity) to utilize the semantic analysis capabilities provided by the semantic analysis system on a subscription basis, as discussed above. Based on the type of subscription and/or the type of analysis desired by the user/customer, the semantic analysis system routes the data to a desired endpoint.

Figure 12:
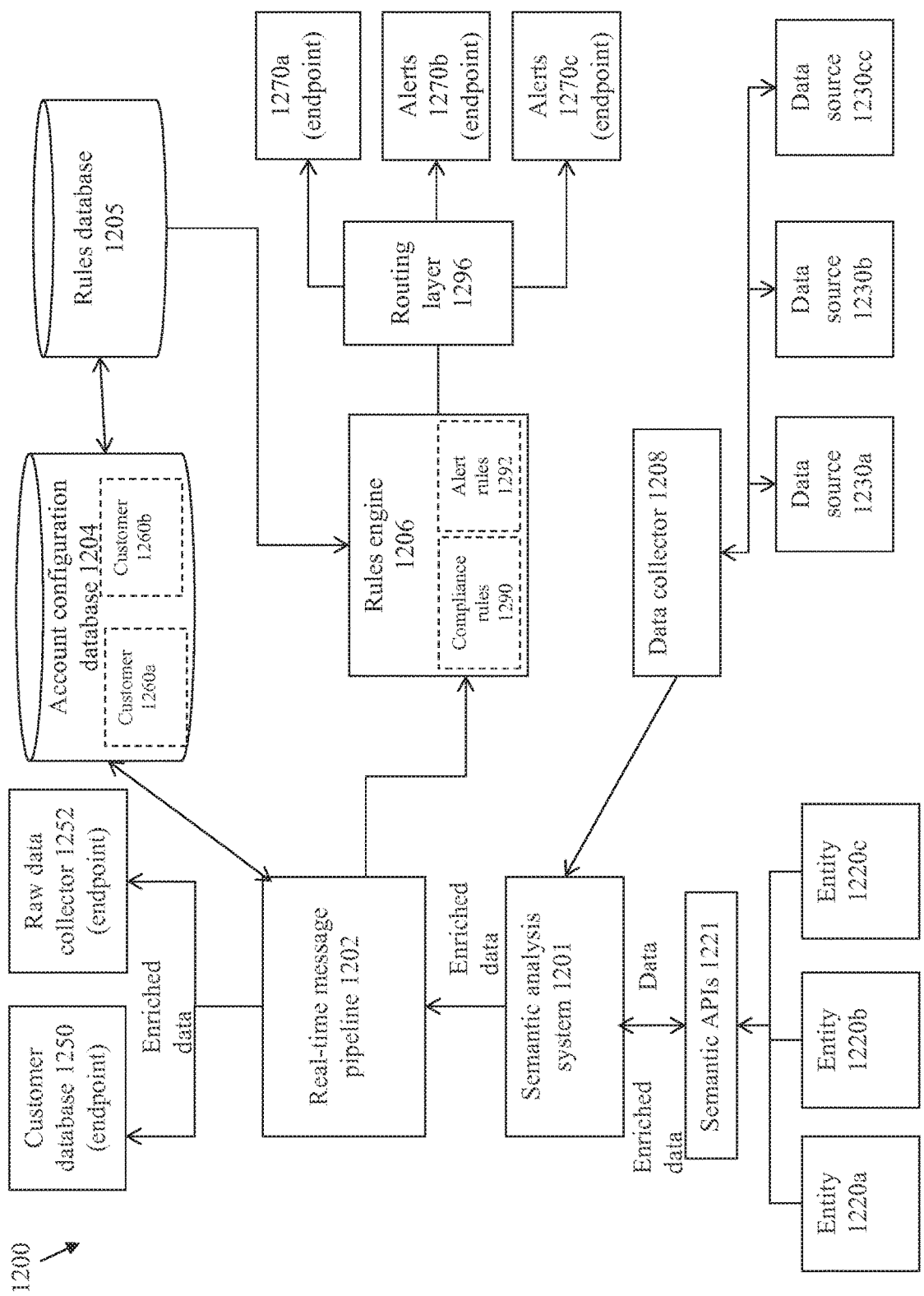
FIG. 12 illustrates a detailed system architecture of a rules-based routing approach.

Referring now to FIG. 12, a general routing infrastructure representing the semantic analysis system and various endpoints is illustrated. At the center of FIG. 12, is the semantic analysis system 1201 that takes data from various sources, and performs semantic analysis as described in the previous figures (FIGS. 1-7). It should be appreciated that the various sub-components are omitted in FIG. 12 for simplicity, but the semantic analysis system 1201 may comprise all the components and/or additional components in various embodiments.

As shown in FIG. 12, the semantic analysis system 1201 receives data from multiple data sources (e.g., 1230a, 1230b, 1230n, etc.) Data coming from the various sources 1230 may be collected and/or aggregated by a data collector 1208 that aggregates the data for consumption by the semantic analysis system 1201. As discussed in detail above, the data sources 1230 may be public data or enterprise private data receiving directly from customers, in one or more embodiments. In one or more embodiments, the enterprise private data may be kept separate from other data sources through a multi-tenant database architecture and/or an identification mechanism such that enterprise data associated with a particular customer is kept private and confidential. In one or more embodiments, the data collector 1208 may format and/or sort the data based on preferences of the semantic analysis system 1201.

As shown in FIG. 12, in addition to data collected from various data sources 1230 (e.g., public data, social media data, enterprise data, community data, etc.), the semantic analysis system may also receive data directly from one or more entities (e.g., 1220*a*, 1220*b*, 1220*n*, etc.) through respective semantic APIs 1221. In one or more embodiments, the various entities 1220 may provide enterprise private data (e.g., emails, private communications, etc.) that comprise identification details (e.g., document ID, text ID, etc.), and submit a POST call (e.g., FIG. 10) identifying the documents to be analyzed by the semantic analysis system. Similarly, a GET call (e.g., FIG. 11) may be submitted to retrieve the results of analysis (e.g., enriched data) from the semantic analysis system 1201.

In other words, based on the authorization and access provided to the various entities 1220, data may be submitted for semantic analysis through the semantic API 1221. It should be appreciated that data coming from the entities 1220 may be kept separate from data that is received from other data sources 1230. In one or more embodiments, data coming from the entities 1220 may be tagged and/or identified (e.g., document ID, customer ID, etc.) such that the data is never stored locally at the semantic analysis system 1201. Rather, data coming from the entities 1220 may go through a different pipeline, such that the identified documents are analyzed and annotated with various enrichments and simply returned back to the entity requesting semantic analysis. Thus, enriched data being returned to the requesting entities 1220 may be considered one endpoint of the semantic analysis system 1201.

As discussed above, while some entities may utilize semantic APIs to provide enterprise private data, other entities may have a subscription plan with the semantic analysis system such that private data, along with public data is semantically analyzed, and either routed back to the customer, or to a dedicated database within the semantic analysis platform. Various organizations may be interested in semantic analysis of data at large (e.g., data from data sources 1230). In other words, rather than having to constantly identify data (e.g., a set of documents) to be periodically submitted to the semantic analysis system 1201 through the semantic API, customers may be interested in receiving results of semantic analysis on global data from various data sources. For example, a beverage company may be interested in the results of semantic analysis to observe trends in how the beverage is being perceived, not just within the company, but in various public media outlets and/or social media websites. To this end, semantically analyzed data (e.g., based on created topics) may be routed such that it may be advantageously (and conveniently) consumed by various customers.

As shown in FIG. 12, the enriched data from the semantic analysis system 1201 may be directed to a real-time message pipeline 1202 that comprises enriched data for all the topics created by all the customers of the semantic analysis system 1201, in one or more embodiments. In one or more embodiments, the real-time message pipeline 1202 comprises the results of the categorization process described with reference to FIGS. 5 and 6.

In one or more embodiments, an account configuration database 1204 may be consulted to determine how the categorized messages must be routed. For example, depending on the preferences of the customer, the enriched data (e.g., categorized messages) may be routed to different endpoints. The account configuration database 1204 may store a set of preferences and/or payment details associated with the customer. In one or more embodiments, the real-time message pipeline 1202 may comprise a processing component that determines the topics related to a particular client by consulting the account configuration database 1204, and may direct the enriched data to the appropriate endpoint.

The account configuration database 1204 may comprise a table identifying various customers, topics created by each customer, a preferred endpoint of the customer, payment details, etc. In one or more embodiments, the preferred endpoint may simply be a database 1250 dedicated to the customer. In one or more embodiments, data from the real-time message pipelines 1202 may be periodically directed to the database 1250 by consulting the account configuration database. For example, a retrieval agent (not shown) may be configured to periodically (e.g., daily, hourly, weekly, etc.) access the account configuration database 1204, and retrieve any updates to the categorized messages for a particular topic associated with the customer.

These updates may be stored in the dedicated database 1250 that may be accessed by the customer through a user interface (not shown). It should be appreciated that the user interface may be utilized by the customer to define topics of interest through the topic creation mechanism detailed in FIGS. 3 and 4. Parameters associated with the topic created by the customer may be stored in the account configuration database 1204 and/or the rules database 1205.

Another endpoint may be a raw data collector 1252. The raw data collector 1252 may simply be a datafeed that collects messages associated with various topics created by the user, and stored in a file server. In one or more embodiments, the data in the datafeed may be stored in a raw format such that customers can perform additional analysis on the raw data. This data may be collected by the customer from the datafeed. For example, a set of messages associated with the created topic may be collected in the datafeed and stored in the file server. The customer may periodically collect the data from the file server in high volumes in order to perform personalized company-specific analysis as needed. In one or more embodiments, the datafeed comprises enrichments provided by the semantic analysis system 1201. As discussed above, the account configuration database 1204 may be consulted to determine that the preferred endpoint for a particular customer is the raw data collector 1252. In one or more embodiments, a routing layer (e.g., complying with compliance rules and routing rules) described further below may have to be applied to the raw data collector 1252. In other embodiments, data may be routed to the raw data collector 1252 after being processed by the rules engine, as will be described further below. Thus, the embodiments illustrated in FIG. 12 should not be read as limiting.

In yet another embodiment, the endpoint may be external to the semantic analysis system, and may have to be routed out of the semantic analysis system, and directly to a customer requesting the enriched data. To this end, the enriched data may be directed to a rules engine 1206 which may appropriately route the data to various customer applications or endpoints. As shown in FIG. 12, the account configuration database 1204 may be consulted to determine that the preferred endpoint for the particular customer is the rules engine 1206. The rules engine 1206 may consult a rules database to determine one or more applicable rules based on which the enriched data is routed to various customer applications.

In one or more embodiments, various alert rules 1290 and/or compliance and routing rules 1292 may be consulted before forwarding the data to a routing layer 1296. The routing layer may timely direct the semantically analyzed messages to various endpoints (e.g., alerts 1270a, 1270b, etc.). Further details on the rules engine and generating alerts will be provided further below.

Figure 14:
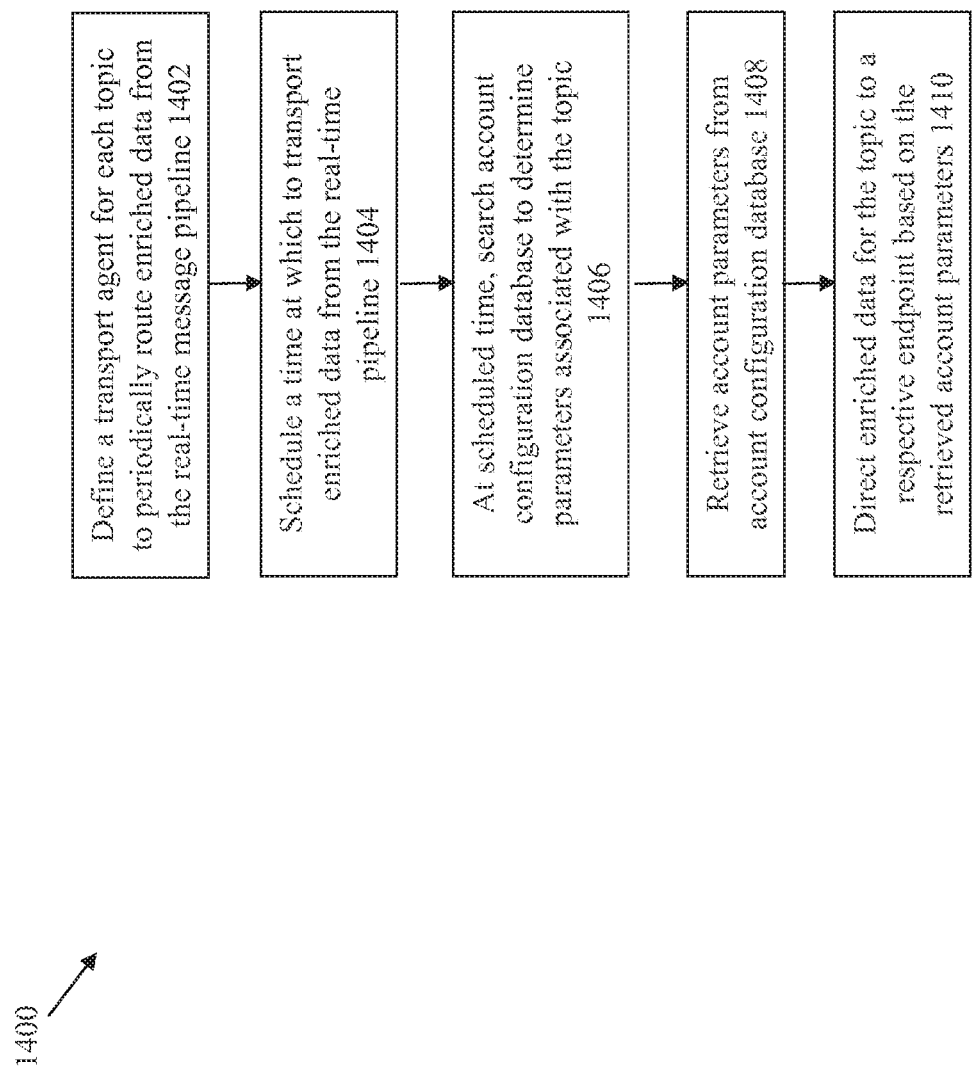
FIG. 14 illustrates an example method to determine an endpoint of categorized messages.

Referring ahead to FIG. 14, an example method 1400 of determining an endpoint for the enriched data is provided. It should be appreciated that other types of methods or algorithms may be used, and the example method provided herein is for illustrative purposes only. In one or more embodiments, the real-time message pipeline 1202 may utilize one or more software retrieval agents or transport agents (not shown) to periodically transport the enriched data associated with various topics to their respective endpoints.

At 1402, a transport agent may be defined or programmed for each topic to periodically transport the enriched data to the right endpoint. In one or more embodiments, each topic may be associated with a transport agent. In other embodiments, each customer may be associated with a transport agent. For example, the transport agent may be defined to run at a particular time (e.g., daily, weekly etc.). The transport agent may be defined such that only recently enriched data (e.g., not previously transported enriched data) is routed to the correct endpoint. The transport agent may also be programmed with the destinations of all possible endpoints (e.g., dedicated database of the customer 1250, raw data collector 1252, rules engine 1204, etc.).

At 1404, the transport agent may define a scheduled time to transport the data from the real-time message pipeline 1202. At 1406, at the scheduled time, the transport agent consults the account configuration database to determine a set of preferences set for the topic. For example, the account configuration database may run a search using an identification of the topic to retrieve information about the customer associated with the topic, and related parameters (e.g., desired endpoint, etc.). Or, in another example, the account configuration database may run a search using an identification number of a particular customer to retrieve information about all the topics associated with the customer, and desired endpoints.

At 1408, based on the search of the account configuration database, a set of parameters of the topic (e.g., a desired endpoint) may be retrieved. At 1410, the transport agent may direct the enriched data (e.g., most recent messages categorized for a particular topic) to the appropriate endpoint (e.g., a particular database dedicated to the customer, the rules engine, etc.) based on the retrieved parameters.

Referring back to FIG. 12, assuming the endpoint for the enriched data of the real-time message pipeline 1202 is the rules engine 1204, a rules-based approach may be provided to handle the routing of processed data.

This approach serves to help an organization scale data content across the organization by giving users tools to setup automated rules to select relevant content and automatically route externally to one or more customer endpoints. The approach can be used to route any of the content described above, including public social data, enterprise private data, and enterprise community data.

As shown in FIG. 12, the rules engine 1204 may consult a rules database 1205 based on which to route the enriched data to various endpoints external to the semantic analysis system. The rules may be user-based or alert rules 1292 that define, for each topic, a set of parameters that triggers an alert. For example, a user (e.g., associated with a customer) may define alert rules for a particular topic such that the user receives an email when a number of negative messages for the particular topic crosses a predefined threshold. Or, the user may define an alert rule such that the user receives a text message when the frequency of messages for a particular time period crosses a predefined threshold.

Additionally, or alternatively, the rules may be compliance rules related to routing of data from particular data sources. For example, there may be compliance rules that require tracking of data acquired from particular data sources (e.g., a social media source). In another example, there may be compliance rules that prohibit routing of data derived from social media sources to on-premise customer applications. It should be appreciated that many social media websites (e.g., Twitter®) require that publicly available data be routed only to cloud-based applications, and not on-premise customer applications. Therefore, if such a rule applies (e.g., based on the desired endpoint and/or the data source), the rules engine 1204 may route only the analysis of the data to the on-premise customer application and not route the messages themselves (e.g., Twitter® messages) to the on-premise customer application.

Similarly, routing rules may apply when routing enriched data externally. For example, routing thresholds may be enforced for one or endpoints. The routing thresholds define a maximum amount of data that may be transmitted to the receiving application at any given time. Similarly, other routing rules specific to the endpoint customer application or endpoint may need to be consulted before routing the data to the desired endpoint.

Figure 15:
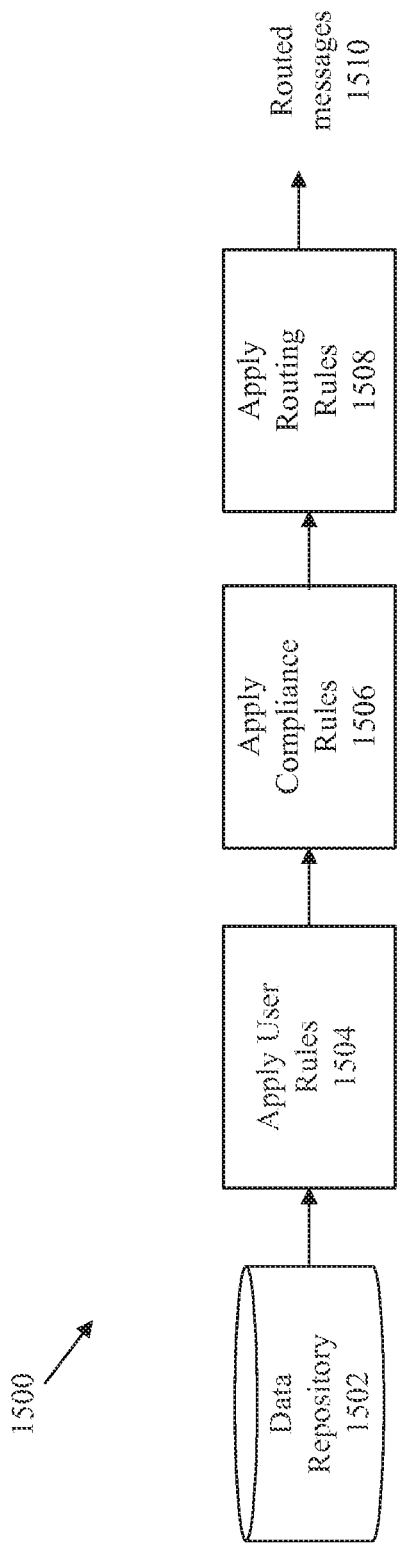
FIG. 15 illustrates an approach that can be taken to implement some embodiments of this invention(s).

Referring ahead to FIG. 15, an approach 1500 that can be taken to implement some embodiments of this invention(s) is illustrated. Data repository 1502 comprises the data to be processed by the rules-based system. In one or more embodiments, the data repository 1502 refers to the real-time message pipeline that comprises enriched data for all customers and all topics. In other embodiments, the data repository 1502 may refer to enriched data that has already been directed to the rules engine 1204, as shown in FIG. 12.

In some embodiments, the data repository 1502 is a common repository (e.g., a common social repository) having content from multiple sources. By running automated rules against a common repository, the solution provides customers with greater options to select relevant content where various data sources intersect (e.g., traditional, proprietary, social enriched with metadata derived from internal IP and from $3^{rd}$ parties). In some embodiments, the data can be maintained in separate repositories.

At 1504, the system applies rules to the data in the repository. The rules may be user-defined rules that are provided by the user/customer for processing the content. In addition to, or instead of the user rules, system provided rules can be used to handle certain/default situations. In one or more embodiments, the user-defined rules may be alert rules.

FIG. 16A shows a flowchart 1600 that provides more details of an example approach to apply user rules to the data. At 1602, a query criteria is applied to the sources within the repository. The query criteria may include, for example, indicators, terms, subjectivity, and/or readability criteria. In addition, the query may pertain to socially enriched data from $3^{rd}$ parties (e.g., Klout® score, sentiment, entities, categories, tags, classification, etc.). Moreover, the query may pertain to demographics derived from multiple sources (such as company, position, income, gender, location, language, time zone).

Next, at 1604, user-defined weightings are applied to the posting criteria. The weightings are used to determine the relative importance of the criteria. For example, users can weigh the criteria so that "Customer Indicator" has more importance than sentiment, or so that manual trigger (manual identification of message status/processing) is more important than all other criteria.

At 1606, scoring is performed. In one or more embodiments, the scoring may be based (at least in part) on the criteria and the weightings. At 1608, the score is reviewed against the user defined rule(s) to evaluate if the post is a candidate for routing. For example, a counting mechanism may be implemented to count a number of messages having the defined criteria (e.g., negative sentiment). If the number of messages crosses a defined threshold, the set of messages and/or analysis of the messages may be routed to an endpoint.

Figure 16B:
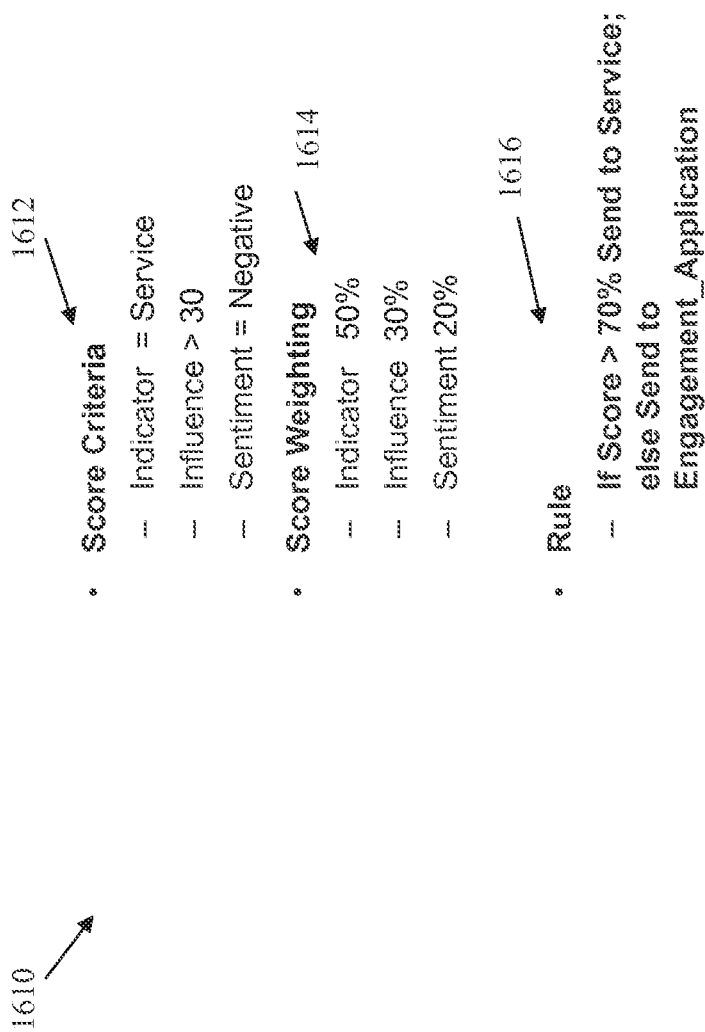
FIG. 16B is an example of how this type of scoring and rules handling can be applied to a message.

FIG. 16B is an example 1610 of how this type of scoring and rules handling can be applied to a message. Here, the various criteria 1612 are identified and have been applied to a message. In addition, relative weights 1614 have been assigned to various criteria. The user rules 1616 are then evaluated against the score, with an indication of whether the message should be routed to a department within the organization (e.g., route to Service department if score is over 70%) or sent for further handling at another point (e.g., send to an engagement software application if not over 70%).

Returning back to FIG. 15, the next action at 1506 is to apply compliance rules to the data content. This step provides built-in compliance with any rules that may have been established that needs to be followed for contractual or legal compliance. This is because various social sites or data provider agreements specify the circumstances under which data may or may not be provided to certain kinds of endpoints. For example, certain social sites have data provider contractual terms which restrict data from those sites from being sent to on-premise applications, while permitting that data to be sent to off-premise cloud applications. Therefore, to ensure compliance with these legal requirements, compliance rules can be implemented and applied to the data content to check whether the endpoint is an on-premise or off-premise endpoint.

Figure 17:
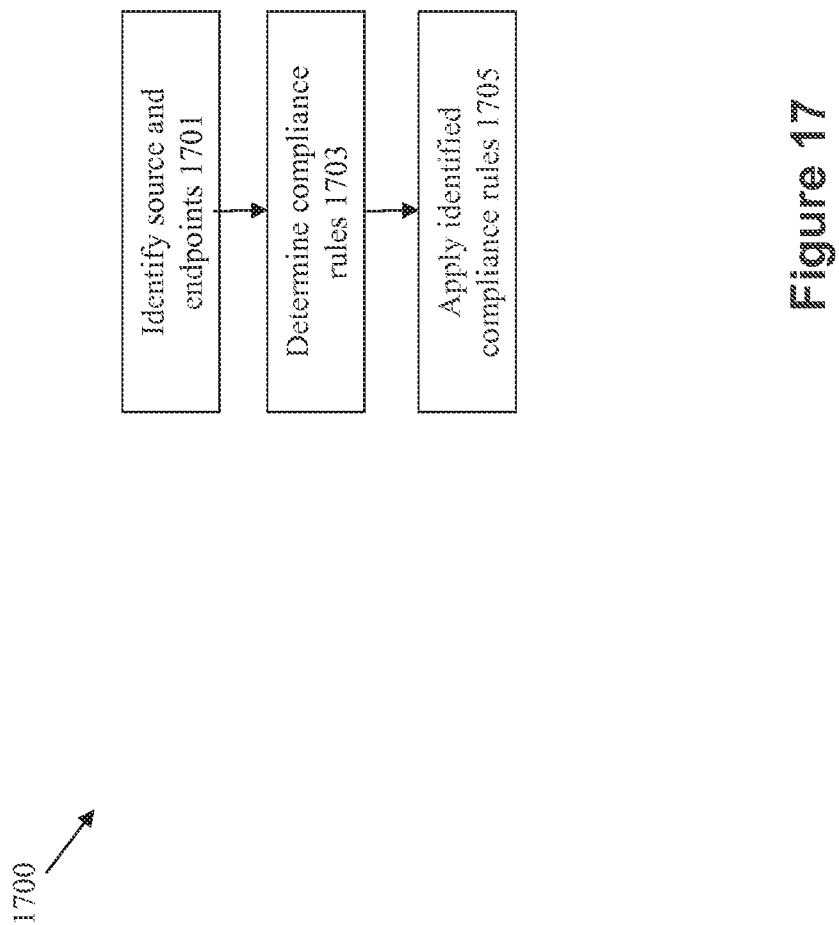
FIG. 17 shows an approach for applying compliance rules the data content.

FIG. 17 shows an approach 1700 for applying compliance rules the data content. At 1701, the process identifies the relevant data source(s) and endpoint(s) for the content. This action essentially determines where the data is coming from, and where it is expected to be sent to. Next, at 1703, a determination is made of the specific compliance rules that are to be applied. This determination is made based at least in part on the source of the data (e.g., whether it is owned, public, and/or proprietary such as company hosted source). In addition, a determination is made of the routing endpoint type (e.g., whether the endpoint is a cloud-based endpoint or an on-premise endpoint, etc.).

At 1705, the identified compliance rule(s) is then applied to the data. This may be implemented by selecting/populating the canonical (message/content) with the allowed data. In addition, plug-ins may be applied if applicable (either internal or from a data provider). This pertains to the situation where the data provider may have a plug-in that permits the data to be viewed even if it cannot be natively provided to an endpoint.

Returning back to FIG. 15, the next action at 1508 is to apply routing rules to the data content. A common data delivery layer is used to route relevant and compliant content to one or many endpoints by evaluating endpoint, control attributes and thresholds.

Figure 18:
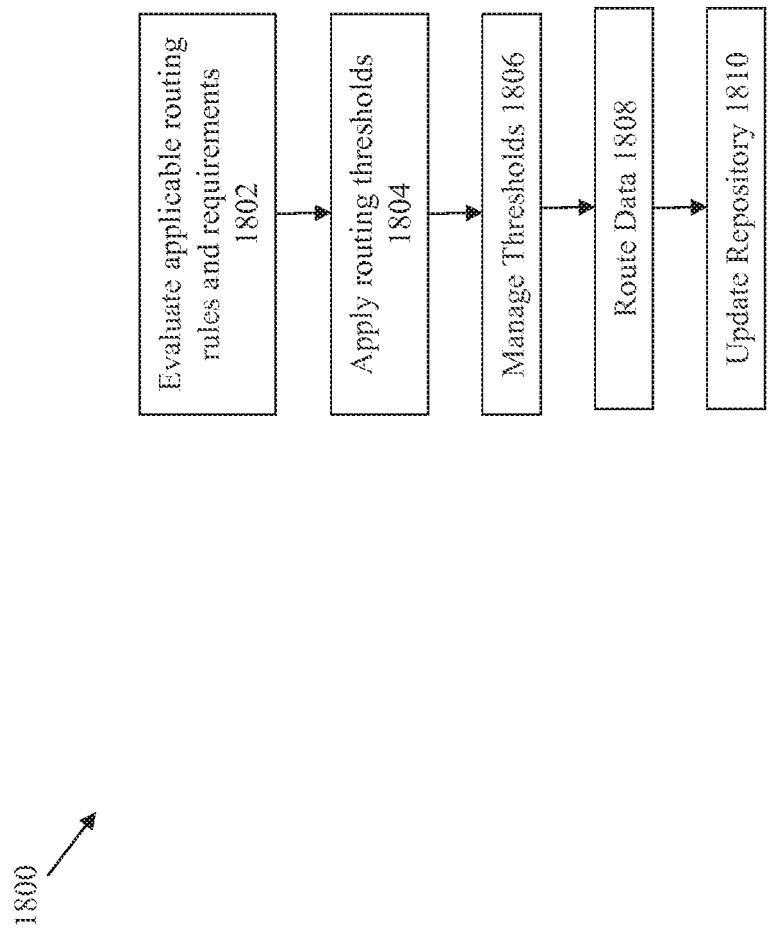
FIG. 18 shows a flowchart of an approach to apply routing rules according to some embodiments of the invention(s).

FIG. 18 shows a flowchart 1800 of an approach to apply routing rules according to some embodiments of the invention(s). At 1802, the applicable routing rule(s) are evaluated relative to the content. This evaluation may also take into account other items of information such as the content priority (e.g., whether alerts have a relatively high priority), data latency requirements, and/or whether the endpoint has selected the type of data transport (e.g., push vs. pull).

At 1804, routing thresholds may be applied, for example, that determine the quantity/throughput of data that can be handled by the endpoint. At 1506, thresholds are managed for the endpoints. This is performed, for example, to manage threshold overages for the endpoint so that (a) the endpoint is not overloaded and (b) no data is lost by the threshold overage.

Next, at 1808, the data is routed via the selected method. The rules can establish the exact endpoint to which the message is routed, including on-premise endpoints, off-premise endpoints, and specific departments within the organization to receive the message. At 1810, the repository can be updated with the selected routing activity.

Referring back to FIG. 13, a more detailed architecture of the rules engine 1204 is provided. It should be appreciated that in some embodiments, an alerts engine may be implemented in addition to the rules engine 1204 to generate alerts based on alert rules defined for topics. In other embodiments, the same rules engine may be utilized for all rules. The following discussion will focus on a common rules engine 1204 for illustrative purposes, but it should be appreciated that other embodiments may utilize separate engines for alert rules and routing rules respectively.

Figure 13:
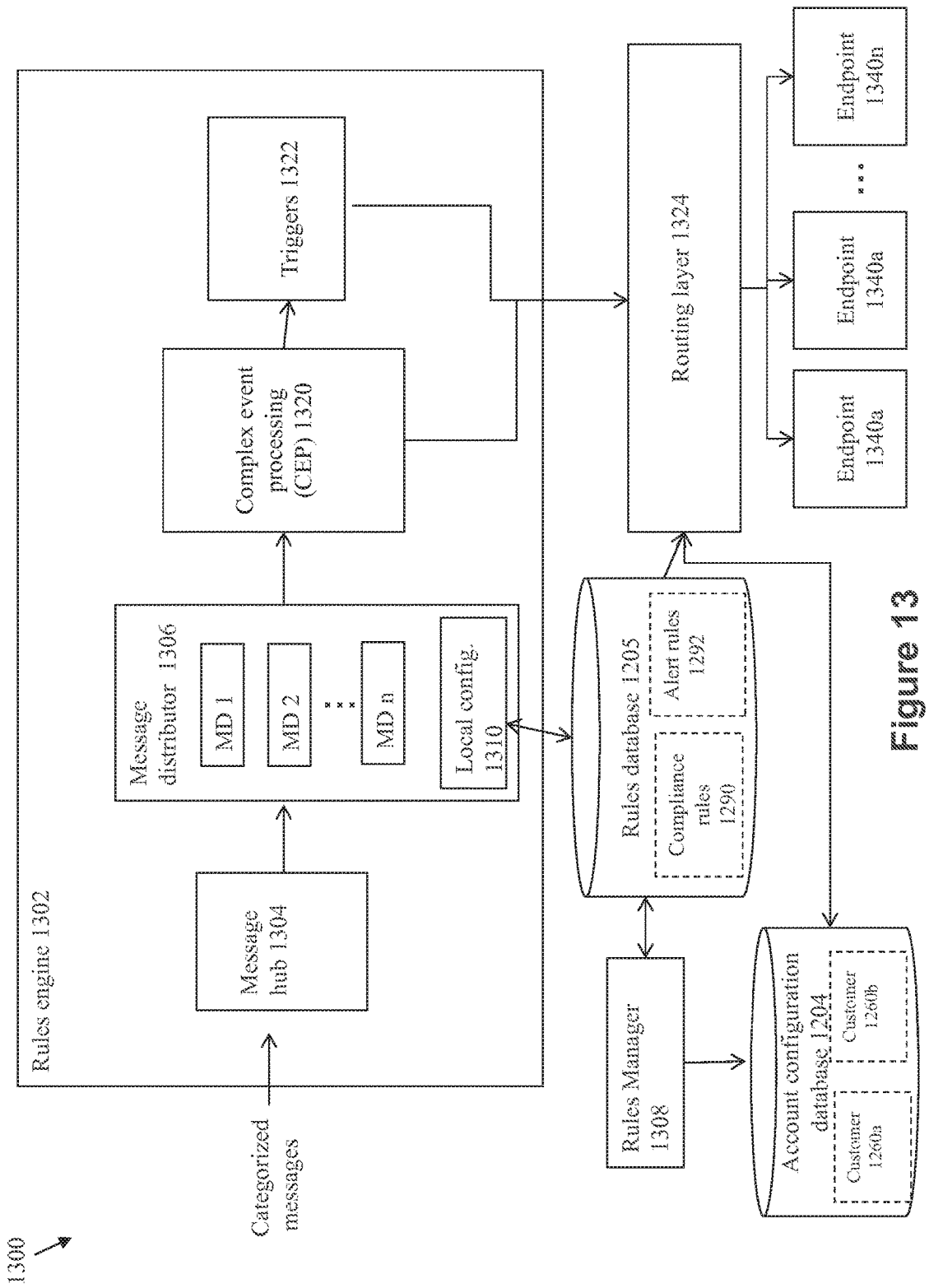
FIG. 13 illustrates a system architecture of a rules engine.

As shown in FIG. 13, the rules engine 1302 receives categorized messages. For example, the categorized messages may be received from the real-time message pipeline 1202. In one or more embodiments, the categorized messages for various topics may be stored at a message hub 1304. The message hub 1304 may collect categorized messages that are periodically received (e.g., hourly, daily, weekly, etc.) from the real-time message pipeline 1202.

In one or more embodiments, messages (e.g., annotated messages, enriched messages) from the message hub 1304 may be sorted using a message distributor 1306. For example, the message distributor 1306 may comprise a plurality of message distributor agents (e.g., MD1, MD2, etc.) that sort the messages based on particular topics. In one or more embodiments, each message distributor may be associated with predefined topics. For example, each topic may have an identification code, and topics having certain identification codes may automatically directed to a particular message distributor.

In one or more embodiments, the rules database 1205 may be accessed by the message distributor agents to determine rules for the various created topics. A copy of the various rules (e.g., alert rules, compliance rules, routing rules, etc.) may be copied to a local configuration data 1310 stored in memory. This may allow the various message distributors to determine which topics are associated with rules, and pass on those topics for further processing.

Not all topics may be associated with rules. Thus, the message distributor agents 1306 may be configured to process only topics that are associated with rules, and disregard topics for which no rules have been defined. From a processing point of view, this sorting process greatly reduces a load on the system, and may positively affect the efficiency of processing.

In one or more embodiments, the rules database may be controlled by a rules manager 1308 that periodically retrieves rules and/or various parameters related to the rules. The rules manager 1308 may periodically retrieve rules from an account configuration database 1204, in some embodiments. To explain, a user associated with a particular customer, may have defined alert rules when configuring a topic. These rules may be stored in the account configuration database 1204. The rules manager 1308 may periodically (e.g., daily, weekly, etc.) retrieve rules from the account configuration database 1204 and store the rules in the rules database 1205. Alert rules may define one or more parameters associated with a topic, and a threshold number of messages that trigger a particular alert rule.

Additionally, the rules manager 1308 may retrieve compliance rules from various sources and store them in the rules database 1205. Compliance rules may define a data source (e.g., a Twitter® message), and a type of customer application that the message can be routed to (e.g., cloud-based application, etc.).

In one or more embodiments, the topics associated with rules may be sent over for processing to a complex event processing (CEP) mechanism 1320 that processes the messages for a topic, against the rules for the topic. For example, if a particular topic is associated with an alert rule that says that if a number of negative sentiment messages exceeds 10,000, then send an alert, the CEP mechanism 1320 may count the number of messages to see if the rule has been triggered. If only 6,000 messages are triggered, the alert may not be triggered, and the CEP mechanism 1320 continues counting, or discards the data if the rule isn't triggered within the predefined time-frame. If, however, 10,001 messages are negative (within the predefined timeframe), a trigger 1322 may be generated by the CEP mechanism 1320. In one or more embodiments, the triggers 1322 may be directed to the routing layer 1324 to be routed to external endpoints. Further details on alert generation are disclosed in U.S. patent application Ser. No. 14/815,714 entitled "METHOD AND SYSTEM FOR IMPLEMENTING ALERTS IN SEMANTIC ANALYSIS TECHNOLOGY," incorporated by reference above.

Similarly, if a message within a topic is associated with a compliance rule (e.g., based on the data source, and the desired endpoint), the message may be withheld from routing. In particular, the message distributor agents 1306 may identify the messages associated with the compliance rule and send the messages to the CEP mechanism 1320. In some embodiments, the CEP mechanism 1320 may perform the necessary processing tasks associated with the rule (e.g., track the message associated with the data source, delete the message from the remaining messages associated with the topic, etc.). This new set of messages may then be directed to the routing layer 1324.

In one or more embodiments, the routing layer 1324 may consult the account configuration database 1204 to retrieve a set of data related to the desired endpoints for the set of enriched data. Additionally, routing rules may be retrieved from the account configuration database 1204 to determine any applicable routing thresholds of the endpoint.

For example, assuming that messages associated with a topic are to be sent to a cloud application, the routing layer 1324 may retrieve a destination address from the account configuration database 124, which stores a set of data defined by the user during set-up. Assuming that no routing rules are violated, the muting layer 1324 may deliver the messages associated with the topic to the cloud application, or a destination within the cloud application (e.g., a user's email address).

Figure 19:
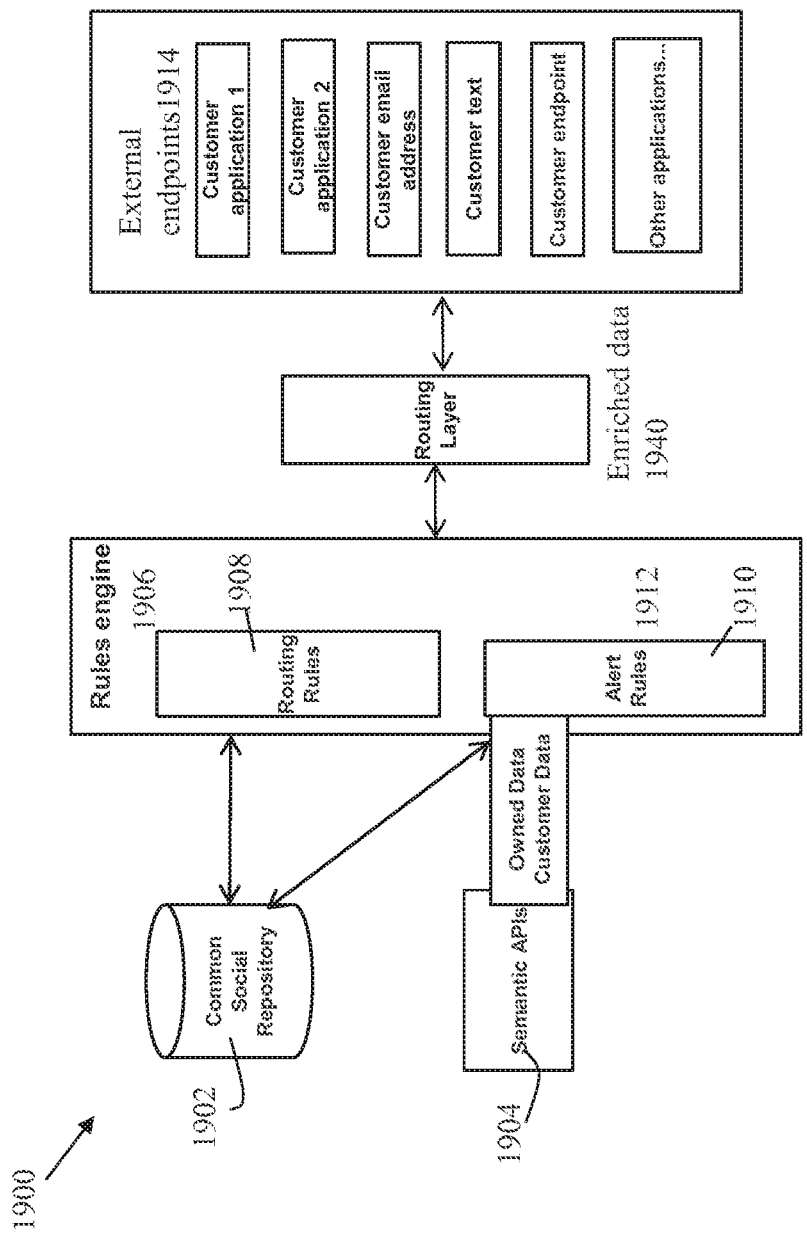
FIG. 19 illustrates an example architecture of a system that can be used to implement some embodiments of the invention(s).

Referring ahead to FIG. 19, an example simplified architecture 1900 of a system that can be used to implement some embodiments of the invention(s) is illustrated. This architecture 1900 includes a rules engine 1906 that interfaces with the routing layer 1912. The data from the common repository 1902 (e.g., a real-time message pipeline, etc.) is processed by the rules engine 1906 and routing layer 1912 as described above. The content is routed through the routing layer 1912 to various endpoints 1914. This mechanism provides a common routing layer 1912 for high volume (automatic) and low volume (manual) data distribution. The content is routed to one or more endpoints 1914 based at least in part on user defined rules (e.g., alert rules 1910), compliance rules (not shown) and routing rules 1908. Alerts can be initiated and routed, as discussed in detail above. In addition, enriched data 1940 may be routed through the routing layer 1912. In one or more embodiments, enrichments (e.g., analysis of the data) may be sent in addition to the messages. In other embodiments, (e.g., based on compliance rules, etc.), only the enrichment (the overall analysis of the semantic analysis performed on the data) is sent to the external endpoint, and certain messages are not transmitted. As described in detail above, a semantic/enrichment API 1904 may be used to interface with this system.

Figure 20:
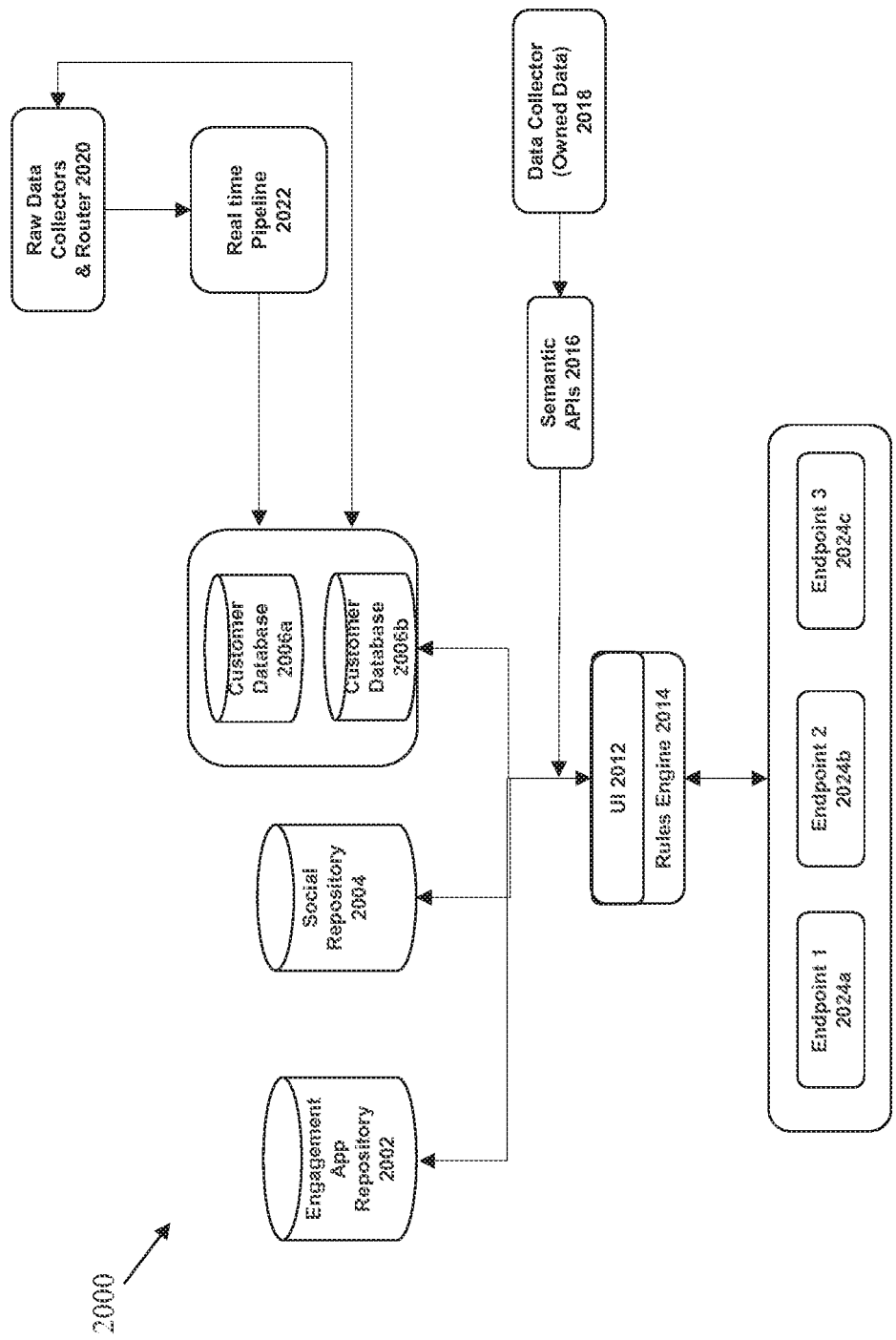
FIG. 20 illustrates another example architecture according to some embodiments of the invention(s).

FIG. 20 illustrates another example architecture 2000 according to some embodiments of the invention(s). This architecture includes multiple different data repositories for the data content to be processed by the system, including a social data repository 2004, a repository maintained for engagement application 2002, and a customer database (e.g., customer database 2006a, 2006b, etc.). As described in detail above, data from the real-time pipeline may be stored in respective customer databases 2006, based on preferences set by the customer.

A rules engine 2014 is provided in the architecture to route data to various endpoints (e.g., 2024a, 2024b, 2024c, etc.) based at least in part on user defined rules. The rules engine 2014 may receive rules through a user interface 2012. As described with respect to FIGS. 12 and 13, one endpoint for data from the real-time pipeline 2022 may be to a raw data collector and routers 2020, which may be used by outside parties to retrieve datafeeds associated with topics of interest. This raw data may be collected by outside parties as required. As shown in FIG. 20, another endpoint of the real-time pipeline 2022 is the dedicated customer database 2006.

A semantic/enrichment API 2016 may be used to interface with this system, providing enterprise data or owned data 2018 for analysis, and receiving enriched data back to the requesting entity through the semantic API 2016. Therefore, what has been described is a system, method, and computer program product for allowing an entity to perform semantic analysis upon private data possessed by an enterprise, and to automatically perform categorization of that data for processing within the enterprise. A semantic API can be provided to allow the enterprise to provide the private data to a sematic analysis system, even when the semantic analysis system is configured as a multi-tenant system that handles other items of public or private data. A rules-based routing architecture may be provided to facilitate analysis and routing of analyzed messages to the appropriate destination within the organization.

System Architecture Overview

Figure 21:
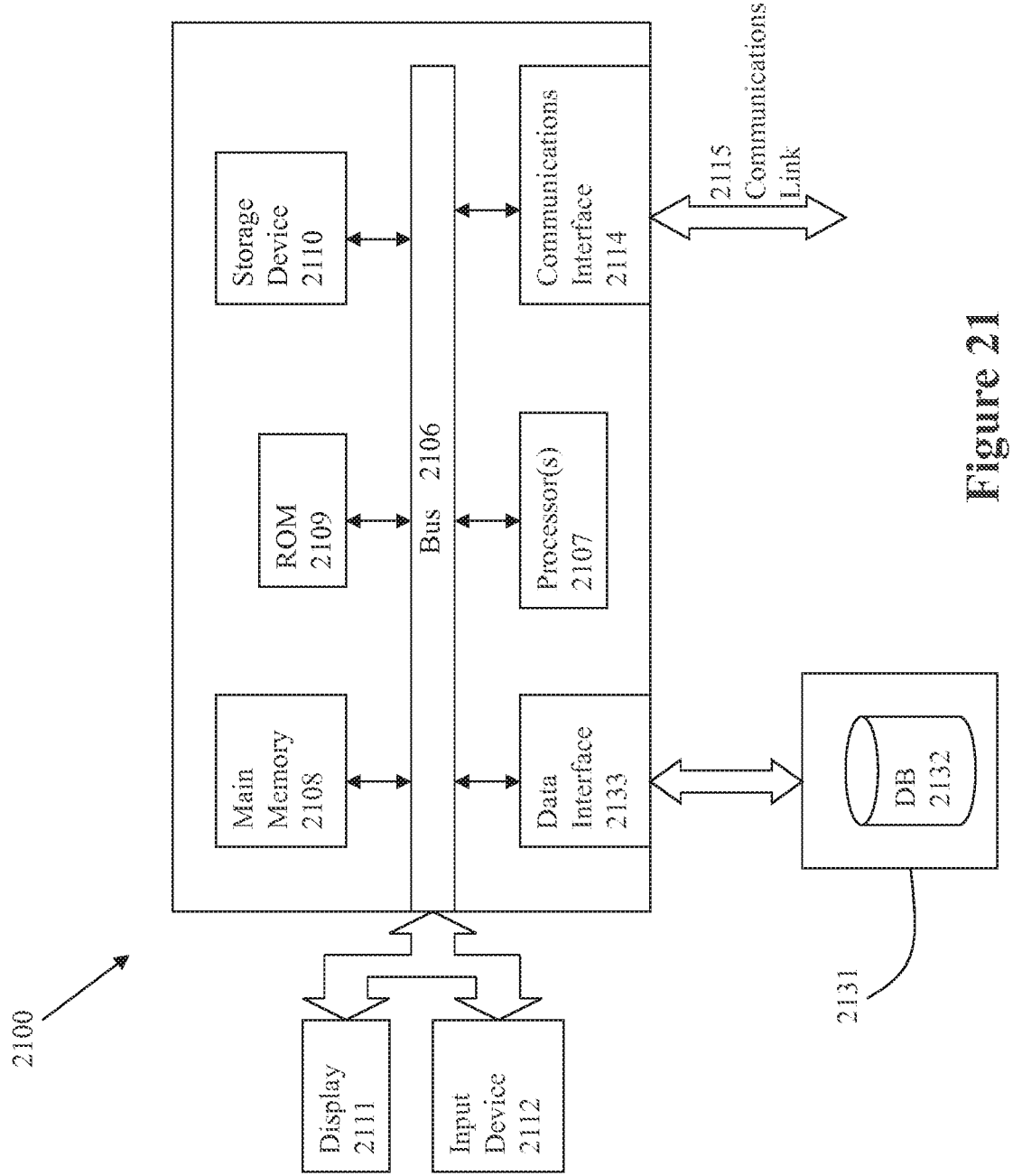
FIG. 21 depicts a computerized system on which an embodiment of the invention(s) can be implemented.

FIG. 21 is a block diagram of an illustrative computing system 2100 suitable for implementing an embodiment of the present invention(s). Computer system 2100 includes a bus 2106 or other communication mechanism for communicating information, which interconnects subsystems and devices, such as processor 2107, system memory 2108 (e.g., RAM), static storage device 2109 (e.g., ROM), disk drive 2110 (e.g., magnetic or optical), communication interface 2114 (e.g., modem or Ethernet card), display 2111 (e.g., CRT or LCD), input device 2112 (e.g., keyboard), and cursor control.

According to one embodiment of the invention(s), computer system 2100 performs specific operations by processor 2107 executing one or more sequences of one or more instructions contained in system memory 2108. Such instructions may be read into system memory 2108 from another computer readable/usable medium, such as static storage device 2109 or disk drive 2110. In alternative embodiments, hard-wired circuitry may be used in place of or in combination with software instructions to implement the invention(s). Thus, embodiments of the invention(s) are not limited to any specific combination of hardware circuitry and/or software. In one embodiment, the term "logic" shall mean any combination of software or hardware that is used to implement all or part of the invention(s).

Any usable medium can be used to participate in providing instructions to processor 2107 for execution. Such a medium may take many forms, including but not limited to, non-volatile media and volatile media. Non-volatile media includes, for example, optical or magnetic disks, such as disk drive 2110. Volatile media includes dynamic memory, such as system memory 2108.

In an embodiment of the invention(s), execution of the sequences of instructions to practice the invention(s) is performed by a single computer system 2100. According to other embodiments of the invention(s), two or more computer systems 2100 coupled by communication link 2115 (e.g., LAN, PTSN, or wireless network) may perform the sequence of instructions required to practice the invention(s) in coordination with one another.

Computer system 2100 may transmit and receive messages, data, and instructions, including program, i.e., application code, through communication link 2115 and communication interface 2114. Received program code may be executed by processor 2107 as it is received, and/or stored in disk drive 2110, or other non-volatile storage for later execution.

In the foregoing specification, the invention(s) has been described with reference to specific embodiments thereof. It will, however, be evident that various modifications and changes may be made thereto without departing from the broader spirit and scope of the invention(s). For example, the above-described process flows are described with reference to a particular ordering of process actions. However, the ordering of many of the described process actions may be changed without affecting the scope or operation of the invention(s). The specification and drawings are, accordingly, to be regarded in an illustrative rather than restrictive sense.

What is claimed is:

1. A method comprising:
receiving, by a multi-tenant semantic analysis system configured to perform semantic analysis for a plurality of tenants, a first digital message associated with a first tenant in the plurality of tenants, wherein the multi-tenant semantic analysis system is a software-as-a-service platform configured to perform sematic analysis on digital content for the plurality of tenants of the sematic analysis system;
performing semantic analysis on the first digital message to identify a first semantically-identified theme corresponding to a content portion of the first digital message;
based on the semantic analysis performed on the first digital message, modifying the first digital message to generate a first enriched categorized message comprising a first digital tag representing the first semantically-identified theme corresponding to the content portion of the first digital message;
applying a first routing rule to the first enriched categorized message, to obtain a first routing evaluation associated with the first enriched categorized message, wherein:
the first routing rule maps the first digital tag to a first endpoint associated with the first tenant;
based at least on the first routing evaluation: electronically transmitting the first enriched categorized message to the first endpoint for consumption by the first tenant;
receiving, by the multi-tenant semantic analysis system, a second digital message associated with the first tenant;
performing semantic analysis on the second digital message to identify a second semantically-identified theme corresponding to a content portion of the second digital message;
based on the semantic analysis performed on the second digital message, modifying the second digital message to generate a second enriched categorized message comprising a second digital tag representing the second semantically-identified theme corresponding to the content portion of the second digital message;
applying the first routing rule to the second enriched categorized message, to obtain a second routing evaluation associated with the second enriched categorized message, wherein:
the first routing rule maps the second digital tag to a second endpoint associated with the first tenant that is different from the first endpoint;
based at least on the second routing evaluation: electronically transmitting the second enriched categorized message to the second endpoint while refraining from transmitting the second enriched categorized message to the first endpoint;
receiving, by the multi-tenant semantic analysis system, a third digital message associated with a second tenant in the plurality of tenants;
performing semantic analysis on the third digital message to identify a third semantically-identified theme corresponding to a content portion of the third digital message;
based on the semantic analysis performed on the third digital message, modifying the third digital message to generate a third enriched categorized message comprising a third tag representing the third semantically-identified theme corresponding to the content portion of the third digital message;
applying a second routing rule to the third enriched categorized message, to obtain a third routing evaluation associated with the third enriched categorized message, wherein:
the second routing rule maps the third tag to a third endpoint associated with the second tenant;
based at least on the third routing evaluation: transmitting the third enriched categorized message to the third endpoint for consumption by the second tenant,
wherein the method is performed by at least one device including a hardware processor.

2. The method of claim 1, further comprising:
determining that the multi-tenant semantic analysis system has refrained from transmitting at least a threshold number of digital messages to the first endpoint;

responsive to determining that the multi-tenant semantic analysis system has refrained from transmitting at least the threshold number of digital messages to the first endpoint:
  transmitting, to the first endpoint, a set of digital messages that (a) the multi-tenant semantic analysis system has refrained from transmitting to the first endpoint and that (b) comprises the second enriched categorized message.

3. The method of claim 1, further comprising:
determining that the multi-tenant semantic analysis system has refrained from transmitting at least a threshold number of digital messages to the first endpoint;
responsive to determining that the multi-tenant semantic analysis system has refrained from transmitting at least the threshold number of digital messages to the first endpoint:
  transmitting, to the first endpoint, one or more message analyses, corresponding to a set of digital messages that (a) the multi-tenant semantic analysis system has refrained from transmitting to the first endpoint and that (b) comprises the second enriched categorized message.

4. The method of claim 3, wherein the one or more message analyses comprises separate message analyses, respectively, for each digital message in the set of digital messages that the semantic analysis system has refrained from transmitting to the first endpoint.

5. The method of claim 3, wherein the one or more message analyses comprises a summary analysis of the set of digital messages that the semantic analysis system has refrained from transmitting to the first endpoint.

6. The method of claim 1, wherein the first routing rule is specific to the first endpoint.

7. The method of claim 6, wherein the first routing rule comprises a data limit for the first endpoint.

8. The method of claim 7, wherein the data limit comprises a data transfer rate limit for the first endpoint.

9. The method of claim 7, wherein the data limit comprises a maximum amount of data to be transferred to the first endpoint.

10. The method of claim 1, wherein the first routing rule is based on one or more compliance criteria.

11. The method of claim 10, wherein the one or more compliance criteria correspond to one or more requirements imposed by a data source from which the multi-tenant semantic analysis system receives digital messages.

12. The method of claim 1, further comprising:
receiving, by the multi-tenant semantic analysis system, a fourth digital message associated with the second tenant;
performing semantic analysis on the fourth digital message to identify a fourth semantically-identified theme corresponding to a content portion of the fourth digital message;
based on the semantic analysis performed on the fourth digital message, modifying the fourth digital message to generate a fourth enriched categorized message comprising a fourth tag representing the fourth semantically-identified theme corresponding to the content portion of the fourth digital message;
applying the second routing rule to the fourth enriched categorized message, to obtain a fourth routing evaluation associated with the fourth enriched categorized message, wherein:
  the second routing rule maps the fourth tag to a fourth endpoint associated with the second tenant; and
based at least on the fourth routing evaluation: refraining from transmitting the fourth enriched categorized message to the third endpoint.

13. The method of claim 1, wherein the first routing rule is specific to the first tenant and the second routing rule is specific to the second tenant.

14. The method of claim 1, wherein the first routing rule is specific to the first endpoint and the third routing rule is specific to the second endpoint.

15. The method of claim 1, wherein the first endpoint is private to the first tenant and the third endpoint is private to the second tenant.

16. The method of claim 1, wherein:
transmitting the first enriched categorized message to the first endpoint comprises:
  associating the first enriched categorized message with a first tenant-specific identifier that is private to the first tenant and prevents the second tenant from accessing the first enriched categorized message, and
  transmitting the first enriched categorized message through a common message pipeline;
transmitting the third enriched categorized message to the third endpoint comprises:
  associating the third enriched categorized message with a second tenant-specific identifier that is private to the second tenant and prevents the first tenant from accessing the third enriched categorized message, and
  transmitting the third enriched categorized message through the common message pipeline.

17. One or more non-transitory machine-readable media storing instructions which, when executed by one or more processors, cause:
receiving, by a multi-tenant semantic analysis system configured to perform semantic analysis for a plurality of tenants, a first digital message associated with a first tenant in the plurality of tenants, wherein the multi-tenant semantic analysis system is a software-as-a-service platform configured to perform sematic analysis on digital content for the plurality of tenants of the sematic analysis system;
performing semantic analysis on the first digital message to identify a first semantically-identified theme corresponding to a content portion of the first digital message;
based on the semantic analysis performed on the first digital message, modifying the first digital message to generate a first enriched categorized message comprising a first digital tag representing the first semantically-identified theme corresponding to the content portion of the first digital message;
applying a first routing rule to the first enriched categorized message, to obtain a first routing evaluation associated with the first enriched categorized message, wherein:
  the first routing rule maps the first digital tag to a first endpoint associated with the first tenant;
based at least on the first routing evaluation: electronically transmitting the first enriched categorized message to the first endpoint for consumption by the first tenant;
receiving, by the multi-tenant semantic analysis system, a second digital message associated with the first tenant;
performing semantic analysis on the second digital message to identify a second semantically-identified theme corresponding to a content portion of the second digital message;

based on the semantic analysis performed on the second
digital message, modifying the second digital message
to generate a second enriched categorized message
comprising a second digital tag representing the second
semantically-identified theme corresponding to the
content portion of the second digital message;
applying the first routing rule to the second enriched
categorized message, to obtain a second routing evaluation associated with the second enriched categorized
message, wherein:
the first routing rule maps the second digital tag to a
second endpoint associated with the first tenant that
is different from the first endpoint;
based at least on the second routing evaluation: electronically transmitting the second enriched categorized message to the second endpoint while refraining from
transmitting the second enriched categorized message
to the first endpoint;
receiving, by the multi-tenant semantic analysis system, a
third digital message associated with a second tenant in
the plurality of tenants;
performing semantic analysis on the third digital message
to identify a third semantically-identified theme corresponding to a content portion of the third digital
message;
based on the semantic analysis performed on the third
digital message, modifying the third digital message to
generate a third enriched categorized message comprising a third tag representing the third semantically-identified theme corresponding to the content portion of
the third digital message;
applying a second routing rule to the third enriched
categorized message, to obtain a third routing evaluation associated with the third enriched categorized
message, wherein:
the second routing rule maps the third tag to a third
endpoint associated with the second tenant;
based at least on the third routing evaluation: transmitting
the third enriched categorized message to the third
endpoint for consumption by the second tenant.

18. A system comprising:
at least one device including a hardware processor;
the system being configured to perform operations comprising:
receiving, by a multi-tenant semantic analysis system
configured to perform semantic analysis for a plurality
of tenants, a first digital message associated with a first
tenant in the plurality of tenants, wherein the multi-tenant semantic analysis system is a software-as-a-service platform configured to perform sematic analysis on digital content for the plurality of tenants of the
sematic analysis system;
performing semantic analysis on the first digital message
to identify a first semantically-identified theme corresponding to a content portion of the first digital message;
based on the semantic analysis performed on the first
digital message, modifying the first digital message to
generate a first enriched categorized message comprising a first digital tag representing the first semantically-identified theme corresponding to the content portion of
the first digital message;
applying a first routing rule to the first enriched categorized message, to obtain a first routing evaluation
associated with the first enriched categorized message,
wherein:
the first routing rule maps the first digital tag to a first
endpoint associated with the first tenant;
based at least on the first routing evaluation: electronically
transmitting the first enriched categorized message to
the first endpoint for consumption by the first tenant;
receiving, by the multi-tenant semantic analysis system, a
second digital message associated with the first tenant;
performing semantic analysis on the second digital message to identify a second semantically-identified theme
corresponding to a content portion of the second digital
message;
based on the semantic analysis performed on the second
digital message, modifying the second digital message
to generate a second enriched categorized message
comprising a second digital tag representing the second
semantically-identified theme corresponding to the
content portion of the second digital message;
applying the first routing rule to the second enriched
categorized message, to obtain a second routing evaluation associated with the second enriched categorized
message, wherein:
the first routing rule maps the second digital tag to a
second endpoint associated with the first tenant that
is different from the first endpoint;
based at least on the second routing evaluation: electronically transmitting the second enriched categorized message to the second endpoint while refraining from
transmitting the second enriched categorized message
to the first endpoint;
receiving, by the multi-tenant semantic analysis system, a
third digital message associated with a second tenant in
the plurality of tenants;
performing semantic analysis on the third digital message
to identify a third semantically-identified theme corresponding to a content portion of the third digital
message;
based on the semantic analysis performed on the third
digital message, modifying the third digital message to
generate a third enriched categorized message comprising a third tag representing the third semantically-identified theme corresponding to the content portion of
the third digital message;
applying a second routing rule to the third enriched
categorized message, to obtain a third routing evaluation associated with the third enriched categorized
message, wherein:
the second routing rule maps the third tag to a third
endpoint associated with the second tenant;
based at least on the third routing evaluation: transmitting
the third enriched categorized message to the third
endpoint for consumption by the second tenant.

* * * * *

UNITED STATES PATENT AND TRADEMARK OFFICE
CERTIFICATE OF CORRECTION

| | | |
|---|---|---|
| PATENT NO. | : 11,403,464 B2 | Page 1 of 1 |
| APPLICATION NO. | : 16/510378 | |
| DATED | : August 2, 2022 | |
| INVENTOR(S) | : Setayesh et al. | |

It is certified that error appears in the above-identified patent and that said Letters Patent is hereby corrected as shown below:

On the Title Page

Column 2, under Abstract, Line 6, delete "sematic" and insert -- semantic --, therefor.

In the Specification

In Column 8, Line 2, delete "PTSN," and insert -- PSTN, --, therefor.

In Column 12, Line 16, delete "values" and insert -- values. --, therefor.

In Column 21, Line 61, delete "muting" and insert -- routing --, therefor.

In Column 22, Line 54, delete "sematic" and insert -- semantic --, therefor.

In Column 23, Line 31, delete "PTSN," and insert -- PSTN, --, therefor.

In the Claims

In Column 23, Line 61, in Claim 1, delete "sematic" and insert -- semantic --, therefor.

In Column 23, Line 63, in Claim 1, delete "sematic" and insert -- semantic --, therefor.

In Column 26, Line 40, in Claim 17, delete "sematic" and insert -- semantic --, therefor.

In Column 26, Line 42, in Claim 17, delete "sematic" and insert -- semantic --, therefor.

In Column 27, Line 50, in Claim 18, delete "sematic" and insert -- semantic --, therefor.

In Column 27, Line 52, in Claim 18, delete "sematic" and insert -- semantic --, therefor.

Signed and Sealed this
Third Day of January, 2023

*Katherine Kelly Vidal*

Katherine Kelly Vidal
*Director of the United States Patent and Trademark Office*